(12) United States Patent
Godsk et al.

(10) Patent No.: US 8,157,533 B2
(45) Date of Patent: Apr. 17, 2012

(54) WIND TURBINE BLADE WITH VARIABLE AERODYNAMIC PROFILE

(75) Inventors: Kristian Balschmidt Godsk, Copenhagen N. (DK); Thomas S. Bjertrup Nielsen, Randers (DK)

(73) Assignee: Vestas Wind Systems A/S, Aarhus N (DK)

( * ) Notice: Subject to any disclaimer, the term of this patent is extended or adjusted under 35 U.S.C. 154(b) by 788 days.

(21) Appl. No.: 12/083,819

(22) PCT Filed: Oct. 17, 2005

(86) PCT No.: PCT/IB2005/053397
§ 371 (c)(1),
(2), (4) Date: Nov. 18, 2008

(87) PCT Pub. No.: WO2007/045940
PCT Pub. Date: Apr. 26, 2007

(65) Prior Publication Data
US 2009/0074574 A1    Mar. 19, 2009

(51) Int. Cl.
| B63H 1/26 | (2006.01) |
| B63H 7/02 | (2006.01) |
| B64C 11/24 | (2006.01) |
| B64C 27/46 | (2006.01) |
| B64C 11/16 | (2006.01) |
| F01D 5/18 | (2006.01) |
| F01D 5/14 | (2006.01) |
| F03B 3/12 | (2006.01) |
| F03B 7/00 | (2006.01) |
| F03D 11/02 | (2006.01) |
| F04D 29/38 | (2006.01) |

(52) U.S. Cl. ........... 416/240; 416/1; 416/23; 416/132 B; 416/142; 416/241 A

(58) Field of Classification Search ............. 416/1, 240, 416/23, 132 B, 142, 241 A
See application file for complete search history.

(56) References Cited

U.S. PATENT DOCUMENTS
6,705,838 B1    3/2004 Bak et al.
(Continued)

FOREIGN PATENT DOCUMENTS
EP    0283730 A    9/1988
(Continued)

OTHER PUBLICATIONS

Int'l Preliminary Examining Authority, Int'l Preliminary Report on Patentability for Int'l Application PCT/IB2005/053397, mailed to Budde Schou A/S on Apr. 3, 2008.

*Primary Examiner* — Ha Tran T Nguyen
*Assistant Examiner* — Aaron Dehne
(74) *Attorney, Agent, or Firm* — Wood, Herron & Evans, L.L.P.

(57) ABSTRACT

A wind turbine blade comprising an active elastic member arranged with access to the surface of the wind turbine blade is provided. The active elastic member is deformable from a first shape to a second shape and the lift coefficient of the airfoil with the active elastic member in the first shape is larger than the lift coefficient of the airfoil with the active elastic member in the second shape. Furthermore, a wind turbine comprising such a wind turbine blade and a method of operating a wind turbine comprising such a wind turbine blade are provided.

37 Claims, 9 Drawing Sheets

U.S. PATENT DOCUMENTS

| | | | |
|---|---|---|---|
| 7,281,891 B2 * | 10/2007 | Smith et al. | 415/4.3 |
| 7,293,959 B2 * | 11/2007 | Pedersen et al. | 416/23 |
| 2002/0047275 A1 * | 4/2002 | Wobben | 290/55 |
| 2004/0105752 A1 * | 6/2004 | Wobben | 415/4.1 |

FOREIGN PATENT DOCUMENTS

| | | |
|---|---|---|
| EP | 1524431 A | 4/2005 |
| WO | WO-2004088130 A | 10/2004 |
| WO | WO-2004099608 A | 11/2004 |

\* cited by examiner

WIND TURBINE BLADE WITH VARIABLE AERODYNAMIC PROFILE

TECHNICAL FIELD OF THE INVENTION

The invention relates to a wind turbine blade. Particularly, the invention relates to a wind turbine blade having an aerodynamic profile, which profile is adjustable by deformation of an active elastic member arranged with access to the surface of the wind turbine blade at the profile.

BACKGROUND OF THE INVENTION

It has been suggested to use a wind turbine blade with an outer shape that may be changed during use. Particularly, it was disclosed in WO 02/051730 to provide a movable or deformable part of a wind turbine blade towards the root, where the chord length is largest. Hence the chord length of the widest part of the blade may be reduced in high winds so that the strain is reduced.

It has also been suggested to deform the leading edge and/or the trailing edge by bending the profile upwards or downwards. For example in WO 2004/088130 it was suggested to bend the leading edge zone and/or a trailing edge flap by means of a smart material or a hydraulic piston assembly. Part of the blade wall is made of a passive, flexible rubber, and during use the passive, flexible rubber is stretched to conform to the smart material or the hydraulic piston assembly. In one embodiment, the rubber comprises isolated voids.

OBJECTS OF THE INVENTION

It is the object of the present invention to provide an improved wind turbine blade with an adjustable aerodynamic profile.

It is another object of the invention to provide an improved method for operating a wind turbine with an adjustable aerodynamic profile.

DISCLOSURE OF THE INVENTION

One or more of the above and other objects of the invention are realised by a wind turbine blade having a suction side and a pressure side, which sides are connected at a leading edge and a trailing edge, the blade further comprises an elastic member arranged with access to the surface of the wind turbine blade. The active elastic member is deformable from a first shape to a second shape, and the maximum lift coefficient, $c_{L.max\ 1}$, of the airfoil with the active elastic member in the first shape is larger than the maximum lift coefficient, $C_{L.max\ 2}$, of the airfoil with the active elastic member in the second shape.

By active elastic member is herein meant that the thickness of the blade changes upon deformation of the elastic member. To realise the desired variation in the maximum lift coefficient, the thickness should typically be increased by at least 10% for at least one position at the active elastic member. It is preferred that the at least 10% is in addition to a possible change in thickness realised by optional bending of the tip region and/or the trailing edge region as this allows for a very fine tuning of the maximum lift coefficient at the active elastic member.

The active elastic member may e.g. be manufactured completely or partially from a rubber-based material or from another polymer-based material.

By having the active elastic member arranged with access to the surface is herein meant that the surface is deformed when the active elastic member is deformed. In other words, the expression arranged with access to the surface includes cases where the active elastic member is partially or completely covered by a surface layer, such as paint, a thermoplastic coating, an actuator means, such as a smart material, a lightning collector or a lightning conductor, etc.

The active elastic member may be provided as a massive sheet or bulk member on a rigid complete or substantially complete blade wall part, for example when a traditional blade is upgraded by arranging an active elastic member thereon. The actuator means and/or a compartment for receiving a fluid may in this case be arranged between the original blade wall and the active elastic member. The active elastic member may also be provided as two or more sheets or massive sheet or bulk members connected to form one or more compartments or recesses therein. Such an active elastic member may likewise be arranged on a rigid complete or substantially complete blade wall part or on a more open structure, such as one or more rigid ribs or other rigid support structure.

The aerodynamic shape of a wind turbine blade is typically formed by interpolation between a number of airfoils, i.e. cross sections of the blade orthogonal to the length of the blade, where each airfoil is optimized for a particular thickness to chord ratio, which again is dictated by the structural requirements of the blade. The present invention concerns wind turbine blades comprising at least one airfoil, which may change shape and aerodynamic properties during use by increasing the thickness of the airfoil.

When the speed of the incoming wind is above a relatively low level, such as e.g. 11 m/s to 13 m/s, then the wind turbine reaches nominal power output and the operation of the wind turbine is more a matter of preventing or limiting damaging of the wind turbine than to optimize the energy output. This is traditionally realised by reducing the efficiency by pitching the blade so the angle of attack of the incoming wind is decreased and thereby decreasing the lift force on the blade. When the speed of the incoming wind is very high, such as above 22-25 m/s, the wind turbine is brought to a halt. However, if the lift of the blade is reduced when the speed of the incoming wind is above the low level, then the window of operation may be extended. When the reduction of the lift is concentrated in the part of the blade away from the blade root, then a reduction of the lift corresponds to a virtual reduction of the rotor radius, which is highly advantageous over traditional pitching or active stall, as the load on the blade is much more favourable and the strain of the blade is considerably reduced. Furthermore, if the lift of the blade is adjusted sufficiently fast, then the blades or even the individual blade may be optimised according to the instantly incoming wind experienced by the blade e.g. during a gust of wind or—if the incoming wind speed is measured in front of the wind turbine—the blades may be optimised even before e.g. a gust of wind arrives and hence greatly reduces the fatigue degradation of the blades considerably.

In a preferred embodiment, the wind turbine blade according to the invention further comprises a blade tension means arranged in the blade to establish the tension of the blade. The blade tension means may advantageously be a strain gauge arranged in a blade wall or a spar of the blade as this allows for a very exact and very local measurement of the tension within the blade. In another embodiment, the blade tension means comprises an optical or conducting fibre. The blade tension means is functionally connected, such as via mechanical means, via an electrical connection or via a wireless connection, to a control unit. The control unit is capable of controlling the shape of the active elastic member and may e.g. be a processor or a computer. The control unit may be connected to more than one wind turbine blade and is preferably integrated with the main control unit of the wind turbine. In an alternative but yet preferred embodiment, the control unit is arranged in the blade so that the individual blade acts autonomously.

In another preferred embodiment, the wind turbine blade further comprises an anemometer arranged near the tip of the blade. The anemometer may be a range of means for measuring the incoming wind speed, the effective wind on one or more of the surfaces of the blade and/or the inflow angle of the wind on the blade. Advantageous examples are a laser anemometer for measuring the wind speed in front of the blade or a pito tube for measuring the inflow angle or the wind speed at the surface of the blade. The anemometer is functionally connected to a control unit. The control unit and connections are discussed above.

The chord line is the straight line between the leading edge and the trailing edge. Camber is the curve formed by connecting the points in the middle between the pressure side wall and the suction side wall. Hence, for an asymmetrical airfoil the camber will deviate from the chord line.

State of the art wind turbine blades typically have airfoils for which the camber deviates from the chord line as this allows for larger lift coefficient and hence requires a shorter chord for constant energy output. Experiments have shown that a change in the shape of the airfoil, which shifts the camber line relative to the chord line, is highly desirable as this tends to lead to relatively large changes in the lift.

In a preferred embodiment, deforming the active elastic member from the first shape to the second shape results in a shift in camber of an airfoil with the active elastic member, the shift in camber is a distance of at least 0.25% chord orthogonal to the chord line for a part of the airfoil corresponding to at least 10% of the chord line. This may e.g. be realised if the camber line is shifted from about 0.030% chord at 70% chord and 0.025% chord at 80% chord to about 0.027% chord at 70% chord and 0.021% chord at 80% chord, but the range of at least 10% of the chord line may also be broken into several intervals.

In a preferred embodiment, deforming the active elastic member from the first shape to the second shape results in a shift in camber of an airfoil with the active elastic member, the shift in camber is a distance of at least 0.25% chord, preferably at least 0.30% chord orthogonal to the chord line for a part of the airfoil corresponding to at least 15% of the chord line. In another preferred embodiment, deforming the active elastic member from the first shape to the second shape results in a shift in camber of an airfoil with the active elastic member, the shift in camber is a distance of at least 0.30% chord orthogonal to the chord line for a part of the airfoil corresponding to at least 10% of the chord line.

Experimental work has shown that the highest sensitivity of the maximum lift coefficient with regard to thickness of the airfoil and hence the most efficient area to arrange an active elastic member is with access to the pressure side of an airfoil of the blade. When the active elastic member is arranged on an existing blade, this means that the advantageous position is on the pressure side of an airfoil of the blade. More particularly, it was found that positioning the active elastic member on the pressure side in an area between the trailing edge and about 40% of the chord length from the leading edge was highly advantageous. In the most preferred embodiment, the active elastic member is arranged in an area between the trailing edge and about 50% of the chord length from the leading edge. The active elastic member is therefore typically arranged in an area between maximum thickness of the airfoil of the blade and the trailing edge, and the maximum thickness of the blade is hence not influenced by the active elastic member, whereas the shape between the maximum thickness and the trailing edge is adjusted and may be modified further during use.

The active elastic member need not extend all the way to the trailing edge, but it was found that this arrangement was structurally favourable and that increasing the thickness of the trailing edge also influenced the size of the maximum lift coefficient considerably. It should be understood that e.g. the expression 'between the trailing edge and about 50% of the chord length from the leading edge' encompasses not only an active elastic member from exactly 50 chord-% to 100 chord-% but also active elastic members arranged completely or substantially within this part of the airfoil.

Furthermore, it was found that an active elastic member between about 50-90% of the chord length from the leading edge was advantageous, and particularly an active elastic member between about 60-95% of the chord length from the leading edge was very advantageous.

In a particularly advantageous embodiment, the active elastic member is arranged so that for a particular airfoil, the active elastic member is provided on the pressure side of the airfoil and the active elastic member begins at about 50-70% of the chord, preferably the active elastic member begins at about 55-65% of the chord, such as about 60% of the chord, and the active elastic member ends at about 80-90% of the chord, preferably the active elastic member ends at about 90-98% of the chord, such as about 95% of the chord. These arrangements of the active elastic member are particularly advantageous, since the camber may be changed in the area where it changes the lift of the airfoil very much.

It may be theorized that the advantage of these arrangements are based on the fact that this part of the blade typically has the camber shifted considerably towards the suction side relative to the chord line and that an expansion of the active elastic member will be very efficient in shifting the camber towards the pressure side of the airfoil and hence typically reduce the asymmetry of the airfoil. In extreme cases, however, the camber may even be shifted to the pressure side of the chord line.

The energy converted in a wind turbine increases with the radius of the blade and hence most of the energy originates from the outer parts of the blade. Therefore, a higher influence on the energy production would be realised for a change in lift of a part of the blade away from the blade root. In a preferred embodiment, an active elastic member is arranged in the outermost 50 radius-% of the blade, such as in at least a part of the range between 50-90 radius-% of the blade or at least a part of the range between 60-95 radius-% of the blade, and arrangement of an active elastic member in the outermost 25 radius-% of the blade is even more advantageous. A change in the maximum lift coefficient in the outer part of the blade will have a similar effect with regard to reducing the fatigue load and energy production as a physical reduction of the radius of the rotor. The present invention of a wind turbine with wind turbine blade having an active elastic member may therefore be considered as having a variable effective aerodynamic rotor diameter and may therefore be considered an alternative for much more structurally complicated blades. This is particularly the case when the airfoil has a very low maximum lift coefficient such as a symmetrical airfoil or a substantially zero lift profile, when the active elastic member is in the shape with low maximum lift profile when the active elastic member is in the shape with low maximum lift coefficient.

In a highly preferred embodiment, a wind turbine blade according to the invention comprises a plurality of active elastic members. For example the blade may comprise 2, 3, 4, 5, 6, 7, 8, 9, 10 or more active elastic members. Having a plurality of active elastic members improves the flexibility with regard to optimization of the profile of the blade. This is particularly important when the individual blade is continuously optimised with regard to the incoming wind or the tension of the blade. Preferably more than one of the plurality of elastic members are arranged with access to the pressure side of the blade. It is preferred that a majority of the active elastic members are arranged in an area between maximum thickness of airfoils of the blade and the trailing edge, as this is the area where the largest effect of active elastic members are realised as discussed elsewhere.

A number of anemometers may advantageously be distributed lengthwise along the blade, so that each of the anemometers is arranged near a different of the plurality of active elastic members. The anemometers are functionally connected to a control unit capable of controlling the shape of the plurality of active elastic members individually. The control unit, connections and relevant types of anemometers are discussed above.

At least two of the plurality of active elastic members are preferably arranged substantially end to end so that a first active elastic member extends from a second active elastic member in the length of the blade. This allows for the adjacent active elastic member to collaborate better and facilitates controlling of the members and forming of smooth transition from one active elastic member to another.

In another embodiment, at least two of the plurality of active elastic members are arranged side by side so that a first active elastic member extends from the second active elastic member substantially orthogonal to the length of the blade. This is particularly relevant for very large wind turbine blades where a single active elastic member or a plurality of active elastic member arranged end-to-end would be too slow to actuate.

In an advantageous embodiment, at least two of the plurality of active elastic members are arranged at least partially overlapping in the length of the blade and/or substantially orthogonal to the length of the blade. Overlapping active elastic member allows for a particularly easy control means for multi-step control of wind turbine blades, as the plurality of steps may be realised by a combination of on/off controlling steps of the individual active elastic members. Particularly it is preferred that the overlapping active elastic member is not identical in size. For example a ⅓-⅔ in size would allow for 4 stages, whereas a ½-½ would only allow for 3 stages.

The size of the active elastic member should be chosen as a compromise between the size of the wind turbine blade, the size of the individual active elastic member and the number of active elastic members. The members should not be too small as this leads to a large number of active elastic members or only limited effect on the maximum lift coefficient. In a preferred embodiment, at least one of the plurality of active elastic members extends 2 to 30 meters in the length of the blade, preferably the active elastic member extends 5 to 20 meters. It is preferred that at least two of the plurality of active elastic members extend 8 to 15 meters in the length of the blade.

For very large wind turbine blades, the rotation speed is typically slower, and large flaps with slower reaction patterns are therefore acceptable. It was found that at least one of the plurality of flaps may advantageously extend 3% to 50% of the length of the wind turbine blade. Preferably at least one of the plurality of flap members extends 5% to 40% of the length of the wind turbine blade. Finally, it is further preferred to have at least two of the plurality of flaps which extend 10% to 25% of the length of the wind turbine blade. Typically this will keep the number of flaps reasonable.

In a preferred embodiment, the wind turbine blade according to the invention further comprises a means to control the shape of the active elastic member individually. This allows for a high degree of freedom with regard to optimization of the configuration of the active elastic member, i.e. which active elastic member to be non-deformed, which active elastic member to be partially deformed and which active elastic member to be completely deformed. Furthermore, individual control allows for radius dependent variation of the maximum lift coefficient so that the lift coefficient may be optimized with regard to local variation in the incoming wind, like e.g. gusts and/or variation due to the cyclic variation of the height above the ground. The means for control of the shape of active elastic members individually may e.g. comprise one or more of a plurality of fluid distribution systems, a single fluid distribution system in combination with individually controllable valves for control of entering and/or exiting of fluid to the active elastic member, pressure gauges for each active elastic member, flow measurement devices for establishing transport of fluid into/from the active elastic member.

In another preferred embodiment, the wind turbine blade according to the invention further comprises a means to control the shape of at least two of the active elastic members in combination. This allows for a more simple design with less sensors and/or distribution systems.

In a further advantageous configuration of the wind turbine blade according to the invention, second shape of the active elastic member is a relaxed state of the active elastic member. The relaxed state corresponds to the equilibrium state where e.g. the pressure of a control fluid corresponds to the external pressure. In other words, the equilibrium state of the active elastic member should in this embodiment be the situation where the maximum lift coefficient of the airfoil is less than the maximum possible value. The results of this is that if the means for controlling the shape of one or more of the active elastic member is deactivated, e.g. by lightning strike not completely diverted by the lightning protection system, by a mechanical failure of the system or by a sensor failure, the system will then shift to a state where the lift is relatively low and hence decrease the likelihood that the system will overspeed or get out of control. In fact this acts as a further safety precaution and leads to a more fail-safe wind turbine. This may be realised by having the additional biasing means in or functionally connected to the active elastic member, by the use of vacuum as a control fluid or by the use of fling-effect for emptying or filling a compartment of the active elastic member.

The difference between the maximum lift coefficient, $c_{L.max\ 1.}$ of the airfoil with the active elastic member in the first shape and the maximum lift coefficient, $c_{L.max\ 2.}$ of the airfoil with the active elastic member in the second shape should be substantial to realise a wide operable range of incoming wind. In a preferred embodiment, the maximum lift coefficient, $C_{L.max\ 1.}$ is at least 10% larger than the maximum lift coefficient, $C_{L.max\ 2.}$ of the airfoil with the active elastic member in the second shape. In another preferred embodiment, the maximum lift coefficient, $C_{L.max\ 1.}$ of the airfoil with the active elastic member in the first shape is at least 15% larger than the maximum lift coefficient, $c_{L.max\ 2}$, of the airfoil with the active elastic member in the second shape. However, it is considered even more preferred that the maximum lift coefficient, $C_{L.max\ 1.}$ of the airfoil with the active elastic member in the first shape is at least 20% larger than the maximum lift coefficient, $c_{L.max\ 2}$, of the airfoil with the active elastic member in the second shape. It is surprising that only these relatively small values of differences is sufficient to tune the blade properties but it was found that this allows for very fine tuning of the aerodynamic properties of the blade—particularly when a plurality of active elastic member is present.

A wind turbine is typically operated in a range of angle of attack, $\alpha$, below $\alpha_{max}$ where $\alpha_{max}$ is the angle of attack corresponding to the maximum lift coefficient. Therefore, also the difference in lift for a range of angle of attack around $\alpha_{max}$ is important. It was found that the difference in the lift coefficient for the airfoil with the active elastic member in the first shape and the second shape, $\Delta c_L$, should be larger than 10% of the largest of the lift coefficients at the angle of attack for all angles of attack between $\alpha=\alpha_{max}-5°$ to $\alpha_{max}$. Preferably, $\Delta c_L > 20\%$ of the largest of the lift coefficients at the angle of attack for all angles of attack between $\alpha=\alpha_{max}-5°$ to $\alpha_{max}°$, such as $\Delta c_L > 25\%$ or even $\Delta c_L > 50\%$. In a particularly advantageous embodiment, the range of $\alpha$, for which $\Delta c_L$ should be above the defined value, is $\alpha=0°$ to $\alpha_{max}+2°$, and more preferably the range of $\alpha$, for which $\Delta c_L$ should be above the defined value, is $\alpha=-2°$ to $\alpha_{max}+3°$. The low values of a correspond to very heavy incoming winds and the high values of a correspond to operation in low winds near $\alpha_{max}$.

The maximum lift coefficient of the airfoil may vary considerably within the inventive idea of the invention. However, in a preferred embodiment, the maximum lift coefficient with the active elastic member in the first shape, $c_{L.max.1}$, is larger than 1.2 and/or the maximum lift coefficient of the airfoil with the active elastic member in the second shape, $c_{L.max.2}$, is below 1.0, where the maximum lift coefficient corresponds to Re in the range 1-10 millions and a two-dimensional flow passing a smooth profile surface. Particularly, it was found to be advantageous that $C_{L.max.1}$ is larger than 1.25 and/or $c_{L.max.2}$ is below 0.9, where the maximum lift coefficients correspond to Re in the range 1-10 millions and a two-dimensional flow passing a smooth profile surface. It should be observed that the actual in use conditions typically depart from these values and that these values should only be understood as what is considered to be favourable in wind tunnel experiments or modelling.

The Reynolds experienced by the airfoil during use may vary considerably dependent on the radial position on the blade and the length of the blade. Typical values of the Reynolds number vary between 1-10 millions.

In a highly preferred embodiment according to the invention, the active elastic member comprises a compartment for receiving a fluid, or the active elastic member forms a compartment for receiving fluid in combination with a rigid part of the wind turbine blade, such as a part of a blade wall. The compartment is arranged so that the filling or emptying of the compartment leads to a change in the shape of the active elastic member; particularly, the compartment should be arranged so that the thickness of the blade at the active elastic member changes upon filling or emptying of the compartment. The use of such a compartment for actuating the deformation of the active elastic member is highly advantageous as it allows for a very delicate, fast and reproducible control of the shape of the active elastic member.

It was found that such a compartment may be used for stepwise deformation, e.g. the compartment being fully filled or completely empty, and/or for continuous deformation, e.g. the compartment being filled to a continuous percentage of the maximum content. It is preferred that the wind turbine blade further comprises a receive valve to control the transport of fluid to the compartment. The receive valve is, advantageously arranged near the compartment to be controlled, as this reduces the dead volume between the valve and the compartment. Furthermore, the receive valve is functionally connected to the compartment to be controlled. The valve may e.g. be a magnet valve or another valve operable in on/off mode or continuously by automation of a control means. The fluid may be received from a fluid distribution system or—if the fluid is air—optionally but not necessarily from the surface of the blade. The receive valve may advantageously be arranged near an end of the compartment towards the root of the blade as this allows the fluid to be move faster into the compartment due to the centripetal force acting upon the fluid during operation of the wind turbine. Furthermore, means, such as pumps, for moving the fluid through the fluid distribution system will typically take up some space and more space is available in the root section of the blade.

It is preferred that the wind turbine blade further comprises a release valve to control the transport of fluid from the compartment. The release valve is advantageously arranged near the compartment to be controlled as this reduces the dead volume between the valve and the compartment. Furthermore, the release valve is functionally connected to the compartment to be controlled. The valve may e.g. be a magnet valve or another valve operable in on/off mode or continuously by automation of a control means. The fluid may be released to a fluid distribution system or—if the fluid is air—optionally but not necessarily to the surface of the blade. The release valve may advantageously be arranged near an end of the compartment towards the tip of the blade as this allows the fluid to move faster from the compartment due to the centripetal force acting upon the fluid during operation of the wind turbine.

In a preferred embodiment, the blade further comprises a sensing means to further control the filling and emptying of the compartment by establishing the presence/absence of fluid in the compartment and/or the amount, e.g. the volume or pressure of the fluid present in the compartment. Preferred sensing means are a pressure gauge and a flow meter but other sensing means may also be suitable. The sensing means is functionally connected to the compartment and said sensing means being capable of establishing a volume of fluid in the compartment e.g. via the pressure of the fluid in the compartment or the flow of fluid to and/or from the compartment.

It was found that the fluid to be entered to the compartment is advantageously distributed inside the blade by a fluid distribution system. The fluid distribution system is in communication with the compartment preferably via the receive valve and/or the release valve for controlling the transport of fluid to and/or from the compartment. The fluid distribution system may be a one-string system or a two-string system dependent on the number and operation of compartment(s).

It is highly preferred that the fluid distribution system is in communication with a means for transporting the fluid. The means for transporting the fluid is also comprised by the wind turbine blade and typically arranged near the root of the blade. Preferred examples of means for transporting the fluid are a vacuum pump (for the fluid being a gas) and high pressure pump (for the fluid being a gas or a liquid).

The fluid may be a gas or a liquid. Gas is preferred as the compressibility of gas is typically higher than for a liquid and a short response time may hence be achieved by simple means such as a pressure container. Furthermore, gas is relatively light and will hence not increase the weight of the blade as much as a fluid. The gas may be of any composition, such as e.g. nitrogen, argon or air. Air is preferred due to the readily availability and the low price. When ambient air is utilised, it is preferred to dehumidify the air prior to use to prevent condensation of water inside the system. Furthermore, air is advantageous in that it may be released from the surface of the blade without any environmental issues. Preferred liquids are water with suitable additives and other suitable hydraulic fluids.

Alternatively, the shape of an active elastic member arranged on the pressure side between the airfoil between the maximum thickness of the airfoil and the trailing edge may be actuatable by other actuator means than fluid in a compartment. Such other actuator means may e.g. comprise smart materials, linear actuators, mechanical devices, pistons extendable by gas or fluid, piezo-electrical materials, etc. The alternative actuator means is typically connected to both a relatively rigid part of the airfoil and the active elastic member. Several of the alternative actuator means (e.g. smart material and piezo-electrical material and some mechanical devices) are advantageous in only requiring an electrical input to actuate and no transfer of e.g. a fluid. This may be advantageous from an installation point of view.

In another aspect, the invention concerns a wind turbine blade having a combination of an active elastic member and a flap, which flap is arranged near the trailing edge of the airfoil. The flap is active in the sense that it is actuatable by an actuator means between a first position and a second position, and the maximum lift coefficient of the airfoil with the flap in the first position is larger than the maximum lift coefficient of the airfoil with the flap in the second position. It was found that the combination of an active elastic member and a flap is highly advantageous since the flap may be used to boost the reduction of the maximum lift coefficient in situations where the more delicate reduction realised by active elastic member(s) is not sufficient. This may e.g. be the situation in extreme winds or for very long wind turbine blades where the difference in incoming wind varies substantially between the highest position of the blade and the lowest position of the blade. The actuation of the flap may be simultaneous to the actuation of the active elastic member but the actuation of the flap should at least be co-ordinated with the actuation of the active elastic member.

The flap may be actuatable in one or more steps, where one of the steps corresponds to maximising of the maximum lift coefficient, or the flap may be actuatable continuously between a position where the maximum lift coefficient is maximised and a position where the flap is bended towards the suction side to yield a lower maximum lift coefficient.

In a preferred embodiment, the flap extends from between 80 to 90% of the chord length from the leading edge to the trailing edge as this allows for the major part of the blade to be structurally rigid. It was found that when the flap extends from between about 85% of the chord length from the leading edge to the trailing edge, the maximum lift coefficient would be sufficiently adjusted by the actuation.

The actuation of the flap may involve a partial rotation of a rigid part of the blade about a pivoting point or a more distributed bending of the trailing edge structure.

In an embodiment of the invention it is preferred as a matter of safety precaution that the relaxed state of the flap, i.e. the state in which the flap will be in the most unlikely event that the control systems should fail, is the second position where the flap is towards the suction side of the airfoil as compared to the first position of the flap. With this arrangement, the blade is less likely to overspeed or even get out of control.

In a highly preferred embodiment, a wind turbine blade according to the invention comprises a plurality of flaps arranged near the trailing edge. For example the blade may comprise 2, 3, 4, 5, 6, 7, 8, 9, 10 or more flaps. Having a plurality of flaps improves the flexibility with regard to optimization of the profile of the blade during use. This is particularly important when the individual blade is continuously optimised with regard to the incoming wind or the tension of the blade.

The size, i.e. the length in the longitudinal direction of the blade, of the flap should be chosen as a compromise between the size of the wind turbine blade, the size of the individual flap and a reasonable number of flaps. The flaps should not be too small as this leads to a large number of flaps, each with only a very limited effect on the maximum lift coefficient. In a preferred embodiment, at least one of the plurality of flaps extends 2 to 20 meters in the length of the blade, preferably the flap extends 5 to 15 meters. It is preferred that at least two of the plurality of flaps extend 5 to 15 meters in the length of the blade. The flap may or may not follow the size of the active elastic member but it is preferred that the ends of the flaps are arranged substantially at the ends of corresponding active elastic member as this is more structurally favourable and prevents twisting of the active elastic member.

For very large wind turbine blades, the rotation speed is typically slower, and large flaps with slower reaction patterns are therefore acceptable. It was found that at least one of the plurality of flaps may advantageously extend 3% to 50% of the length of the wind turbine blade. Preferably at least one of the plurality of flap members extends 5% to 40% of the length of the wind turbine blade. Finally, it is further preferred to have at least two of the plurality of flaps which extend 10% to 25% of the length of the wind turbine blade. Typically this will keep the number of flaps reasonably.

In a highly preferred embodiment of the invention, the plurality of flaps is arranged one extending another in the length direction of the blade and an elastic connector is arranged between adjacent flaps so that flaps form a continuous surface free from steps in the longitudinal direction of the blade. This may be realised if the extending flaps are separated by a short distance, such as 10 cm to 50 cm to give space for the elastic connector, and the elastic connector is connected to the end faces of both flaps and to the rigid part of the blade.

Even if actuator means of the flap may be actuatable in other ways, it is highly preferred that the actuator means of the flap is actuatable by a fluid and particularly by the same fluid as the active elastic members (if the active elastic member is actuatable by a fluid) as this allows for a more simple control system. Furthermore, the actuator means of the flap may advantageously be functionally connected to the fluid distribution system, which is in communication with an active elastic member. This allows for a more simple design of the fluid distribution system, it reduces the space requirements for the overall fluid distribution system and it reduces the overall weight of the system.

Other types of actuator means to actuate the flap may comprise smart materials, which change shape upon change of a potential over the material, linear actuators, mechanical devices, pistons extendable by gas or fluid, piezo-electrical materials. Particularly the actuators, which only need an electrical signal to actuate, are advantageous due to relatively easy installation in the blade.

It should be observed that the most favourable results were obtained when the airfoil is free from substantial steps in the surface and having a rounded shape so that no separation of the airflow over the airfoil (except at the trailing edge) takes place during use. To reduce the sensitivity towards the minor steps, which is virtually unavoidable between the rigid part of the blade and the active elastic member, it is preferred that the airfoil has a blunt leading edge. Preferred shapes are disclosed in co-pending patent application WO2005IB052355, which is incorporated herein by reference.

In another aspect, the invention relates to a subunit for installation on a wind turbine blade. The wind turbine blade has a suction side and a pressure side, which sides are connected at a leading edge and a trailing edge to form a rigid blade surface. The subunit comprises an active elastic member with the properties and shape as discussed with regard to the one or more embodiments of other aspects of the present invention. The active elastic member is adapted with regard to shape and size to being connected to a rigid surface part of a wind turbine blade, so that during operation of a wind turbine comprising the wind turbine blade with the subunit installed thereon, the active elastic member is deformable from a first shape to a second shape. This may e.g. be realised by actuator means as discussed with regard to embodiments of one or more of the other aspects of the present invention, such as linear actuators or fluid entering and/or exiting a compartment formed at least partially by the active elastic member. Similar to the first aspect of the invention, the maximum lift coefficient of the combined structure of the subunit and the wind turbine blade in the first shape, $C_{L.max\ 1}$, is larger than the maximum lift coefficient of the combined structure of the subunit and the wind turbine blade with the active elastic member in the second shape, $C_{L.max\ 2}$.

The subunit is particularly advantageous in upgrading an existing wind turbine blade so that the blade may e.g. be operable in a larger range of incoming wind or in reducing the wear of the blade by reducing the fatigue load due to wind gust or extreme winds. Since the subunit and particularly the active elastic member may simply be adhered to the surface and the—optional—fluid distribution system installed inside the blade e.g. with flexible tubes, the installation is simple and does not involve changes in the blade structure (except from the very limited effect of connection holes between the active elastic member and the fluid distribution system through the blade wall) and addition of further reinforcement is hence typically not required.

In yet another aspect, the invention concerns a method of operating a wind turbine with a variation of the effective aerodynamic profile of the blade. The method comprises the step of establishing the incoming wind speed and if the incoming wind speed is below a first threshold value then to deform an active elastic member from the second shape to the first shape, so that the lift of the airfoil at the active elastic member is increased. The anemometer may be of any type and preferably of the type discussed in relation to the first aspect of the present invention. The anemometer is preferably arranged on the wind turbine blade, but the anemometer may also be arranged near the wind turbine, such as on an adjacent wind turbine or structure, or the anemometer may be arranged on another part of the wind turbine, such as on the tower or the nacelle. In a particularly preferred embodiment, the anemometer is a laser anemometer and is arranged on the hub at an angle relative to horizontal, so that it will scan the area in front of the wind turbine and hence be able to measure the instant incoming wind speed as a function of the height over the earth. This allows for a very precise optimisation with regard to cyclic pitch or cyclic radius variable aerodynamic profile of the blade as discussed elsewhere. In addition to or instead of measuring the incoming wind speed, the anemometer may advantageously measure the inflow angle of the wind at the wind turbine blade. This may e.g. be advantageous in that this provides data for further optimisation of the blade including pitch angle.

Similarly to the described method where the incoming wind speed is measured and ascribed a threshold value, the other possible input parameters for control of the wind turbine, such as the load of the blade e.g. by a strain gauge, the inflow angle of the wind, rotor speed or power output, may also be ascribed individual or coupled threshold values.

The level of the first threshold value depends on the actual design of the wind turbine blade, the active elastic member(s) and flap(s) of the blade as well as the location of operation. A typical value of the first threshold is in the order of 10 to 16 m/s, but other values may in some cases be relevant.

The operation is typically optimised to provide the maximum power output within an acceptable level of fatigue load and/or level of noise emission. Furthermore, the operation may be controlled on a basis of average incoming wind, on a basis of maximum or mean incoming wind within a given time frame, on a basis of current incoming wind or on the basis of the inflow angle of the wind as measured by an anemometer, on the basis of the load of the blade, e.g. by a strain gauge, or on the basis of operation parameters such as rotor speed or power output. The relevant threshold levels depend on the optimisation parameter and may vary over time, e.g. due to variation in allowable noise emission with the time of the day.

In another embodiment of the method according to the invention, the method further comprises the step that if one of the input values such as the incoming wind speed is below a second threshold value, then the flap is actuated from the second position to the first position so that the lift of the airfoil at the flap is increased. The second threshold value may be the same as the first threshold value but it is preferred that the second threshold value is more tolerant than the first threshold value, such as for incoming wind, e.g. 15 m/s, as this allows for more steps of regulation and hence a more fine tuning of the aerodynamic properties of the blade.

Another embodiment of a method of operating a wind turbine with a wind turbine blade according to any embodiment of the first aspect of the present invention comprises the steps of establishing the tension of the wind turbine blade, and—if the tension is below a first threshold value—of deforming the active elastic member from the second shape to the first shape so that the lift of the airfoil at the active elastic member is increased. The tension of the wind turbine blade is preferably established by a blade tension means arranged in the wind turbine blade such as in the blade wall or in a reinforcement structure like e.g. a spar. The blade tension means is preferably a strain gauge. The use of the strain measurement as a control parameter is advantageous as it is based directly on the actual effect of the wind on the blade and hence stress on the blade and not an indirect feature such as the wind speed, which is indirectly related via the design properties of the blade.

In another embodiment of a method of operating a wind turbine with a wind turbine blade according to any embodiment of the first aspect of the present invention, the shape of the active elastic member is adjusted according to the rate of change of tension of the wind turbine blade. Hence, the shape of the active elastic member may be changed to a shape with a lower lift when the blade starts to deflect due to a gust of wind and not wait for the deflection to become large. This allows for a more delicate control with regard to extreme gusts.

In another embodiment of the method according to the invention, the method further comprises the step that if the tension wind speed is below a second threshold value, then the flap is actuated from the second position to the first position so that the lift of the airfoil at the flap is increased further. The second threshold value may be the same as the first threshold value but it is preferred that the second threshold value is higher than the first threshold value as this allows for more steps of regulation and hence a more fine tuning of the aerodynamic properties of the blade.

If the wind turbine is pitch-regulated, the method according to the invention may advantageously comprise the step of adjusting the overall pitch angle of the blades according to the established wind speed and/or tension so that the operation of the wind turbine may be further optimised.

Another method according to the invention relates to wind turbine blade, which comprises at least two active elastic members arranged at different distances from the blade root and at least two of the active elastic members are independently deformable. The method comprises the steps of for each active elastic member establishing the incoming wind speed at said active elastic member and if the incoming wind speed is below a local threshold value for that active elastic member, such as 10 m/s, then the active elastic member is deformed from the second shape to the first shape. This increases the maximum lift of the airfoil at said active elastic member.

The establishing of the incoming wind speed at each active elastic member may be indirectly. For example, it is within the inventive idea of the present invention to measure incoming wind speed in just one position on the blade, on the wind turbine or at an adjacent structure, or the incoming wind speed may be deduced from e.g. the energy output, the tension of the blade, etch, and used for establishing the desired configuration of the individual active elastic members based on the relative position along the length of the wind turbine blade.

In a preferred embodiment according to the invention, parameters, such as the threshold values, for regulation of the operation of the wind turbine are optimized so that during operation the wind turbine will produce maximum energy output within an acceptable level of wear of the wind turbine. This method is particularly advantageous in locations with frequent strong winds and particularly when the incoming wind speed is measured in front of the wind turbine, e.g. by a laser anemometer. In a highly advantageous variant of this embodiment, the regulation is sufficiently fast to take into account gusts of wind, which typically is responsible for a large fraction of the total fatigue wear of wind turbine blades. The high regulation frequency may e.g. be realised by the use of a gaseous fluid entering/exiting a compartment at least partially formed by the active elastic member as this means of regulation is very fast and reliable.

In another preferred embodiment according to the invention, parameters, such as the threshold values, for regulation of the operation of the wind turbine are optimized so that during operation the wind turbine will produce maximum energy output within an acceptable level of acoustic emission of the wind turbine. This method is particularly advantageous in locations near buildings or other areas often visited by humans. The requirements regarding acoustic emission typically vary with the time of the day and the parameters should be adjusted accordingly.

The active elastic member may be adjusted with any frequency that may be realised by the control means and the actuator. However, if the active elastic member is to be adjusted solely with regard to mean incoming wind or another input parameter, which only changes slowly, then the frequency of the change of shape and the speed of the shape change may be low, such as below 0.1 Hz-0.01 Hz or even lower. This frequency of change of shape allows only to a limited extent for adjustment to short term changes in the incoming wind and cannot take into account variation in the turbulence of the wind. On the other hand, low frequency variation of the shape will be able to take into account most of the variation of the wind speed in many cases.

It is highly preferred that the adjusting of the shape of the individual active elastic members is repeated with a frequency of more than 10 Hz. The incoming wind and turbulence may change quite rapidly, e.g. if a gust of wind arrives to the wind turbine. Therefore, it is even more preferred that the adjustment is repeated with a frequency of more than 20 Hz, such as with a frequency of more than 40 Hz. The ability to adjust very rapidly allows the wind turbine to be operated very close to the optimum configuration, as e.g. incoming gusts of wind may be accounted for dynamically and need not be taken into account in the average configuration. The rapid adjustment frequency requires that the shape of the active elastic member may be adjusted very rapidly. It was found that particularly the active elastic member regulated by gas entering/exiting a compartment at least partially formed by the active elastic member allows for very rapid adjustment. Furthermore, active elastic member regulated by electrically rapid adjustable actuators, such as e.g. piezoelectric elements, may likewise be suitable for such rapid adjusting of the shape of the active elastic member.

The frequency of adjusting of the shape of the individual active elastic members may alternatively be related to the rotation speed of the blade. In a preferred embodiment, the adjustment is repeated with a frequency corresponding to less than an $8^{th}$ of a rotation of the blade about the rotation axis. However, it is more preferred that the adjustment takes place with a frequency corresponding to less than a $16^{th}$ of a rotation of the blade about the rotation axis, and even more preferably with a frequency corresponding to less than a $40^{th}$ of a rotation of the blade about the rotation axis.

In a highly preferred embodiment, the regulation is cyclic with a period of the regulation corresponding to one rotation of the wind turbine rotor. Within this period, one or more active elastic member(s) and/or flap(s) may be adjusted several times, but overall, the configuration pattern is substantially repeated cyclically. It was found that such cyclic variation is particularly advantageous in taking into account wake and shadow effect from neighbouring wind turbines e.g. in a wind turbine park, and/or effects from a complex surrounding terrain. These effects are typically cyclical but do not necessarily have a period corresponding to one rotation of the rotor. An example where cyclic variation with a period of one rotation of the rotor is particularly advantageous is when the wind turbine is operated based on a time average incoming wind so that the regulation mainly takes into account the vertical variation of the incoming wind speed and only adjusts for changes in the overall incoming wind speed on a longer time frame. Another example is the shadow from the tower which is also typically a cyclic effect with a period of one rotation of the rotor. This provides for a relatively simple operation, which is particularly suitable for very large wind turbines with very long wind turbine blades, such as longer than 40 meters, 50 meters, 60 meters or even longer, where the vertical variation in incoming wind speed is considerable.

For wind turbines operated by cyclic pitch, it is particularly advantageous to overlap the cyclic pitch with individual radius-dependent variation of the airfoil section as this allows for a finer tuning of the aerodynamic properties of the blade and hence a higher power output and/or lower fatigue wear of the blade.

In a preferred embodiment, the adjusting of at least one active elastic member or flap is stepwise, so that the active elastic member is either in the first shape or in the second shape. For an active elastic member, which forms at least a part of a compartment for receiving a fluid, this corresponds preferably to the compartment being fully inflated or completely evacuated. A stepwise regulation of this type corresponds to an on/off regulation and is advantageous in that the shapes are very well-defined and that the calibration hence is limited.

In another preferred embodiment, the shape of the active elastic member is adjusted substantially continuously so that the active elastic member is deformed to several stages, maybe deformed to several stages, such as 3, 4, 5, 6, 7, 8 steps or continuously without any steps between the shape providing the smallest maximum lift coefficient and the shape providing the largest maximum lift coefficient. For an active elastic member, which forms at least a part of a compartment for receiving a fluid, this corresponds to the compartment being partially filled in smaller steps. A substantially continuous regulation is particularly advantageous in that the maximum lift coefficient of the airfoil at the active elastic member may be adjusted very delicately, whereby operation closer to the optimum situation may be realised.

Another embodiment of a method of operating a wind turbine having a wind turbine blade according to the invention involves an adaptive control algorithm or even artificial intelligence. This is advantageous when the wind turbine blade comprises individually adjustable airfoils arranged at different distances from the blade root. For example, it has been found that this embodiment of method of operating is particularly advantageous for a wind turbine comprising a plurality of active elastic members and/or a plurality of flaps and especially but not limited to wind turbine blades where the at least one of the active elastic member(s) and the flap(s) is adjustable to more than two shapes, such as continuously adjustable as this leaves a vast number of possible configurations of the active elastic member(s) and flap(s).

In a highly preferred embodiment, the elastic member and/or flaps are combined with a control system with both fast reaction time and a monitor and feed back devise that enables the elastic member and flaps to be positioned for maximum load reduction. When constantly monitoring the forces, an adaptive control system will be able to reposition the flaps and elastic members during iterative optimisation cycles for maximum load reduction or power production. The combination of a plurality of active elastic members and an adaptive control device enables the wind turbine to effectively reduce the load from the blade's own eigen-frequency by damping the amplitude of the blade's oscillations. Furthermore, a variation of the wind velocity in the span-wise direction will be effectively reduced with the combination of active elastic members and an adaptive control device.

The method comprises the steps of establishing at least one of incoming wind speed, noise emission and strain of blade; and based on artificial intelligence to establish a configuration of a plurality of the active elastic member(s) and/or flap(s) of the blade. The establishing of configuration preferably concerns all of the active elastic member(s) and flap(s) of the blade, but in some cases it may be advantageous that the establishing of configuration only concerns some of the active elastic member(s) and flap(s) of the blade. The established configuration should optimise the power output of the wind turbine within an allowable level of strain in the wind turbine blade and/or within an allowable level of noise emission. Finally, the method comprises the step of adjusting the active elastic member(s) and flap(s) accordingly. The configuration of the plurality of the active elastic member(s) and/or flap(s) is preferably optimised a multiplicity of times, such as 8, 10, 20 or more times, during one rotation of the rotor comprising the blade as this allows the blade to be operated by individual radius-dependent variation of the airfoil section.

By artificial intelligence is herein meant a self-learning or self-adjusting system, such as a system operable by fuzzy logic.

The invention also relates to the use of wind turbine blade according to the first aspect of the invention for a wind turbine operable by individual radius-dependent variation of the airfoil section. Individual radius-dependent variation of the airfoil section is particularly advantageous for very large wind turbines, such as wind turbines with rotor diameters of about 80 meters, 100 meters, 120 meters or above, as the cyclic variation of the incoming wind speed for such large blades varies considerably. This difference may not be adjusted for sufficiently by regular pitch as the variation of the incoming wind speed for such large blades is highly radius-dependent. In other words, the cyclic variation of incoming wind speed is much smaller for parts of the blade towards the blade root than for parts of the blade towards the blade tip.

A further aspect of the invention relates to a wind turbine, which comprises at least one wind turbine blade according to the first aspect of the invention. This wind turbine is particularly advantageous in that it provides very fine options for optimisation of the aerodynamic profile during use and hence allows for production of more energy in many cases with a lower fatigue load and/or a lower noise emission than traditional wind turbines.

A preferred embodiment of the wind turbine according to the invention further comprises an anemometer arranged on a hub of the wind turbine. The anemometer is functionally connected to a control unit, which control unit is capable of controlling the shape of an active elastic member of said at least one wind turbine blade. It is particularly advantageous to use a laser anemometer and to arrange the laser anemometer at a non-horizontal angle and that the laser anemometer is of a type, which is capable of measuring the incoming wind speed in various distances from the laser anemometer. In this way, the wind speed may be measured in a plurality of vertical levels in front of the wind turbine blade(s) so that the aerodynamic profile of the blade(s) may be adjusted according to the momentarily incoming wind speed during use. In this way, the wind turbine blade may e.g. be adjusted to take into account wind gusts before the wind gust actually arrives at the blade, hence considerably reducing the fatigue damage to the blade.

BRIEF DESCRIPTION OF THE DRAWINGS

The invention will be explained more fully below with reference to exemplary embodiments as well as the drawings, in which.

All the figures are highly schematic and not necessarily to scale, and they show only parts which are necessary in order to elucidate the invention, other parts being omitted or merely suggested.

DESCRIPTION OF THE DRAWINGS

Figure 1:
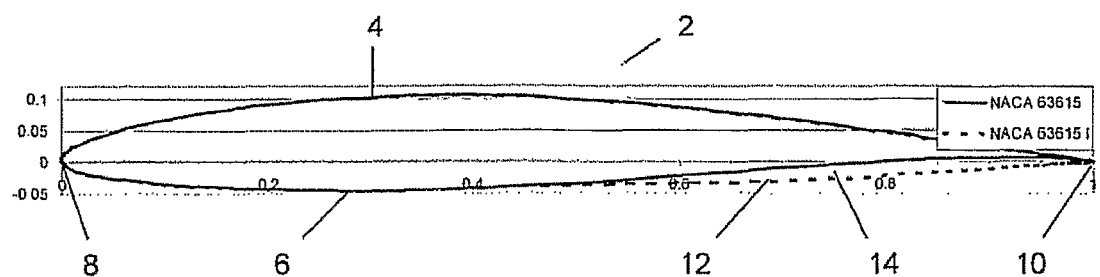
FIG. 1 shows an airfoil with an active elastic member in the first and the second shape and corresponding lift diagrams.
Figure 1:
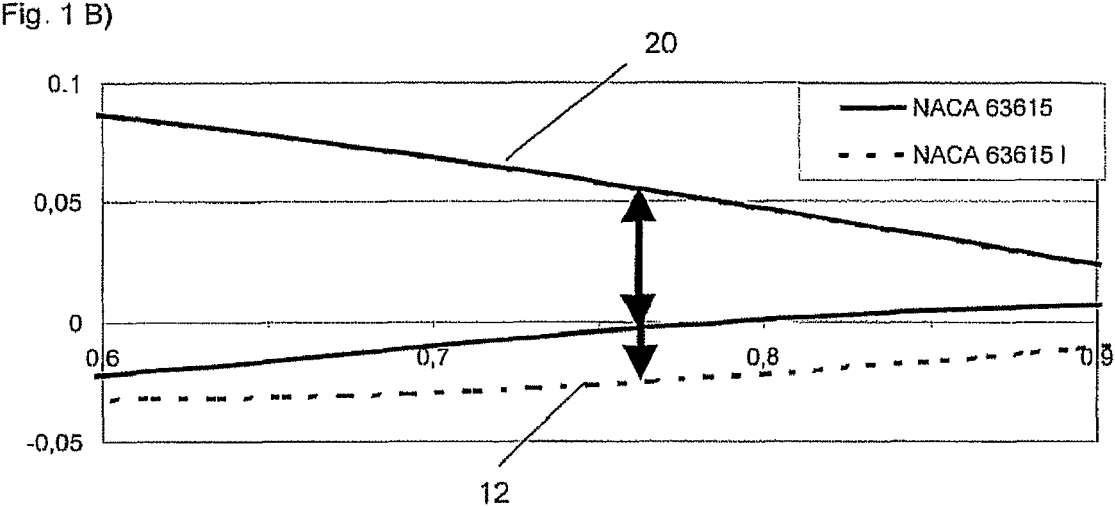
Figure 1:
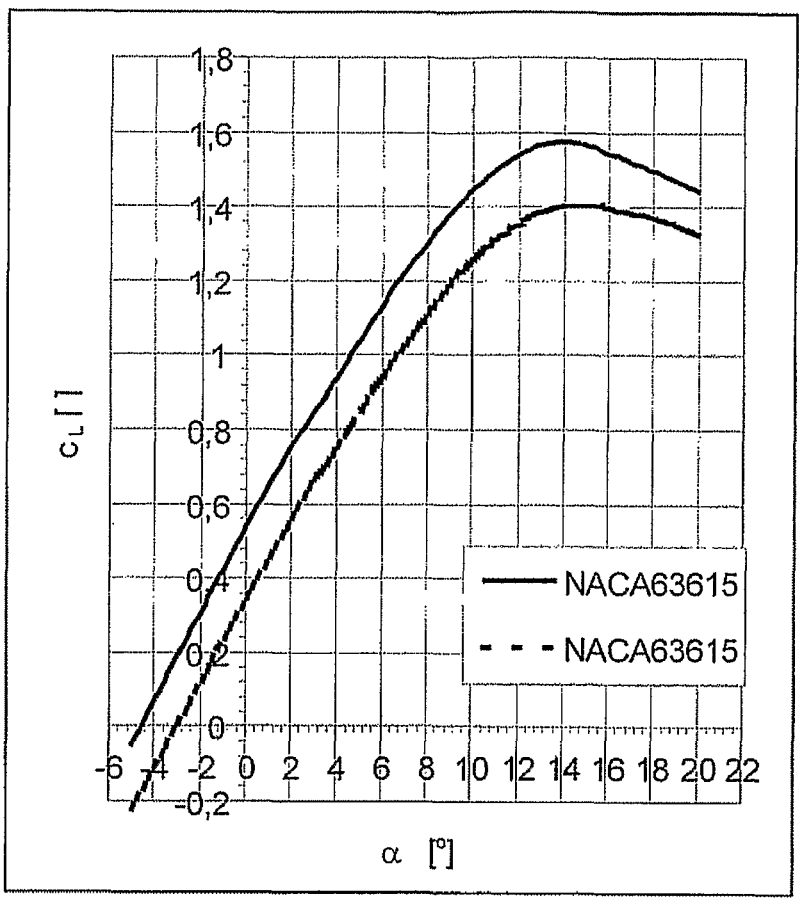
Figure 1:
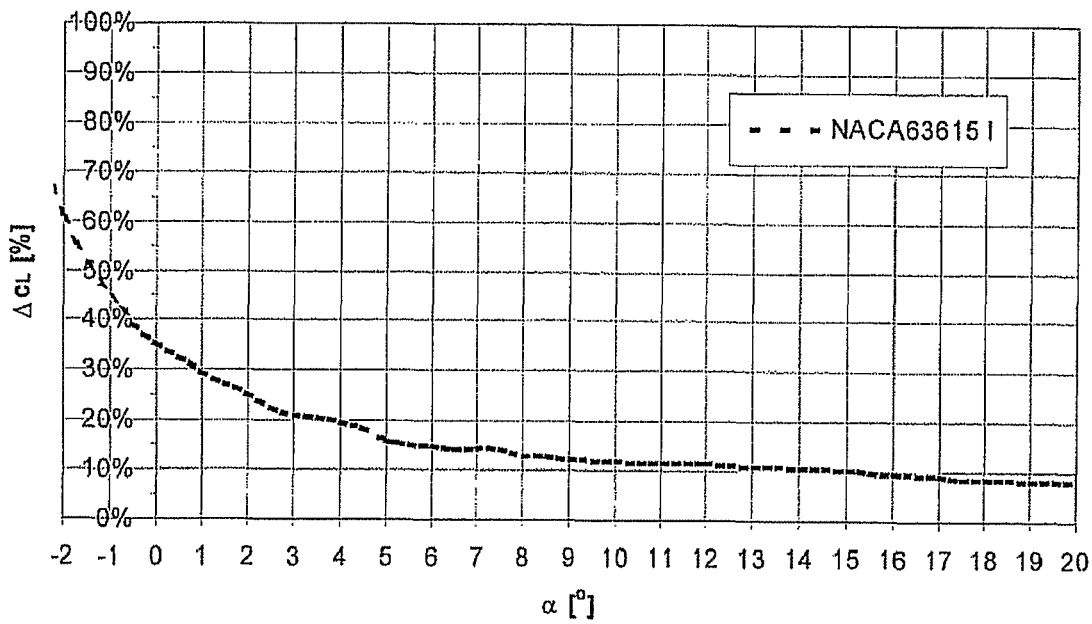

The wind turbine blade according to the invention is typically manufactured by vacuum-assisted resin infusion. The main reinforcement is typically arranged in the blade wall, or in a spar arranged inside the blade walls. FIG. 1A shows an example of a profile of a wind turbine blade 2 with camber different from the chord line (corresponding to the x-axis). The blade has a suction side 4 and a pressure side 6 connected in the leading edge 8 and the trailing edge 10. The blade further comprises an active elastic member 12 arranged at the pressure side. The active elastic member is shown as a broken line (indicated by NACA 62614 I) and corresponds to active elastic member in the expanded state. The active elastic member forms part of a compartment 14 for receiving a fluid, such as air.

In FIG. 1B, a part of FIG. 1A corresponding to 0.6 to 0.9 of the chord is shown. It is particularly observed that the thickness at the elastic member increases upon expansion of the active elastic member. Here, the increase in thickness is in the order of 30-40% at the arrow corresponding to about 0.77 chord length from the leading edge. Experimental results have shown that an increase in thickness in the order of 10-150% in at least a part of the range between 0.65-0.9 chord length from the leading edge will typically lead to suitable properties of the blade.

A plot of the lift coefficient $c_L$ as a function of the angle of attack, $\alpha$, for the profile in FIG. 1A is provided in FIG. 1C. It is observed that the plot corresponding to the profile with the active elastic member in the deformed state exhibits a substantially lower lift coefficient in all of the shown range and particularly the maximum lift established as the maximum lift coefficient for each curve is also lower for the profile with the deformed active elastic member. This is observed more clearly in FIG. 1D, where the reduction of the lift coefficient, $C_L$, as compared to the unmodified NACA63615 profile is presented as a function of the angle of attack, $\alpha$. It is observed, that the lift coefficient is reduced by at least 10% in the range up to the critical angle of attack about $\alpha=14°$ (corresponding to the maximum lift coefficient).

The example profile is a NACA 63615 profile but the same principles may be applied for other wind turbine blades. Particularly, it is preferred that the profile has a high maximum lift coefficient.

Figure 2:
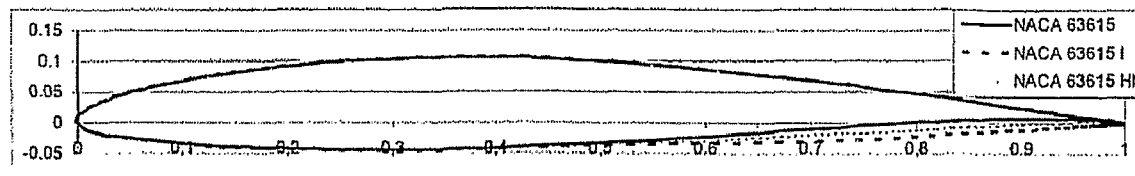
FIG. 2 shows an airfoil with overlapping active elastic members and corresponding lift diagrams.
Figure 2:
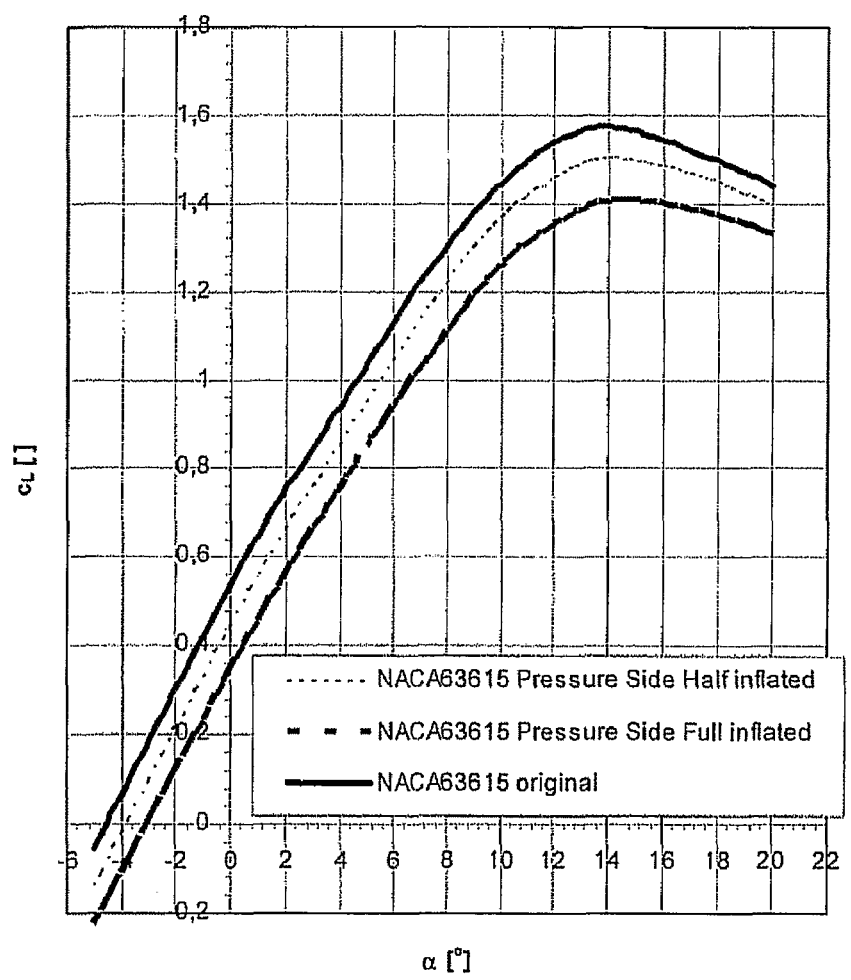
Figure 2:
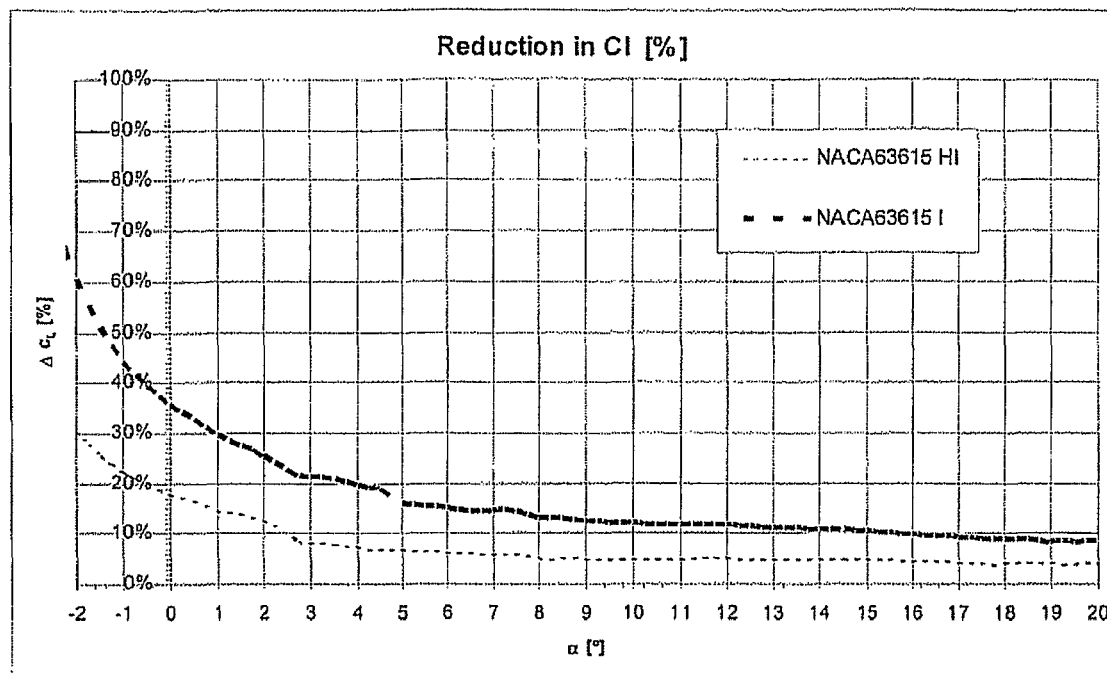

FIG. 2 also concerns an airfoil of a wind turbine blade according to the present invention. FIG. 2A shows the profile with two further profiles indicated as NACA63615 I and NACA63615 HI. The two further profiles may be formed by deforming the active elastic member in two steps, by having an active elastic member with two compartments or two individual active elastic members arranged on top of each other in the section shown in FIG. 2A. The lift diagram of the three profiles is shown in FIG. 2B. It is observed that the lift coefficient decreases with the size of the deviation of the airfoil from the original, non-deformed airfoil indicated NACA 63615. The same trend is observed in FIG. 2C, where the decrease in lift coefficient for the two adjusted airfoils is shown relative to the lift coefficient of the original, non-deformed airfoil.

Figure 3A:
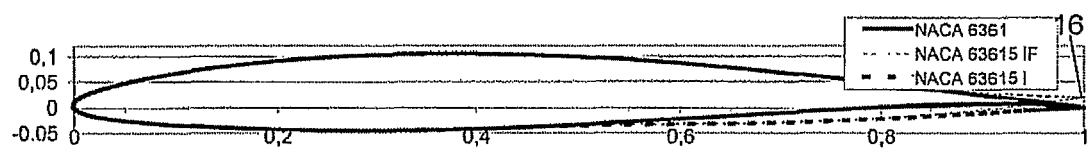
FIG. 3 shows an airfoil with an active elastic member and a flap and corresponding lift diagrams.
Figure 3B:
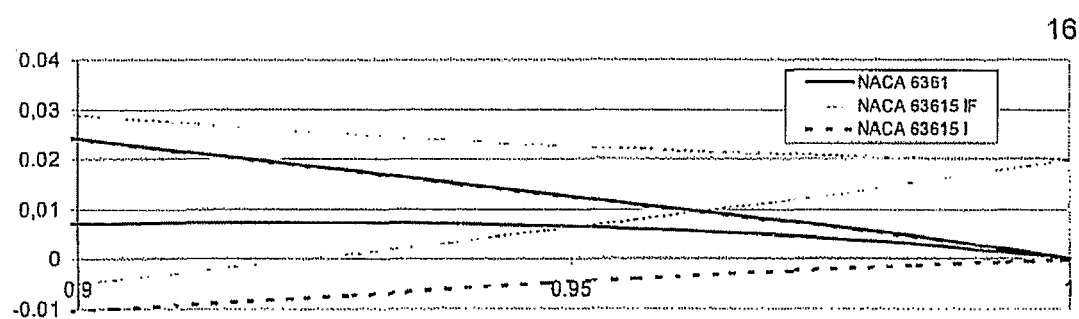
Figure 3:
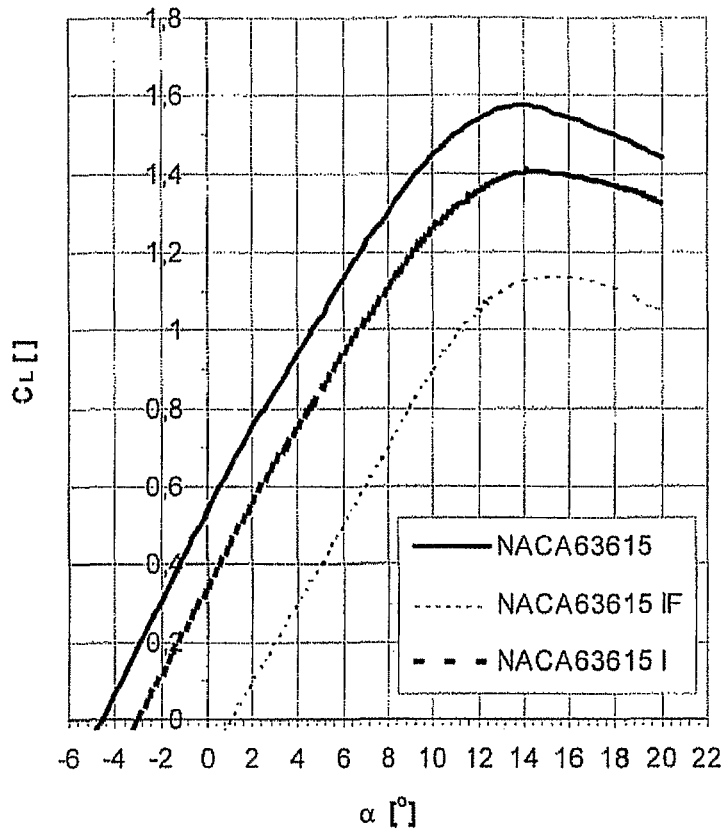
Figure 3:
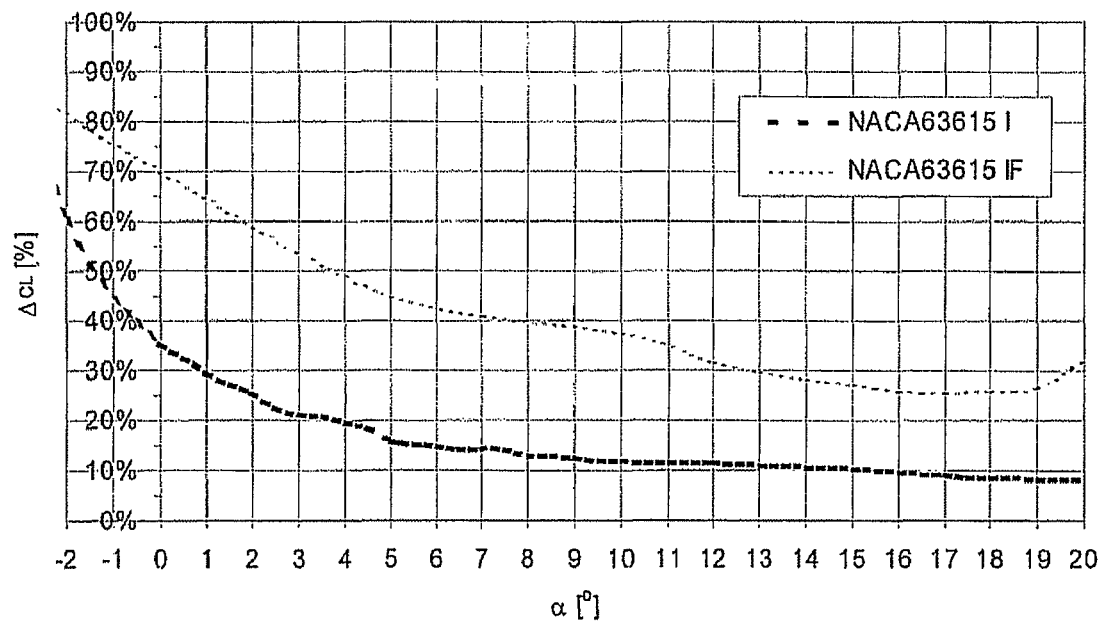

FIG. 3 also concerns an airfoil for a wind turbine blade according to the present invention. FIG. 3A shows the original profile together with a profile with the active elastic member deformed (NACA 63615 I) and a profile with both the active elastic member deformed and the flap 16 bent upwards. In FIG. 3, the trailing region of the blade is shown in further details. It should be observed that for the purpose of modelling, a sharp trailing edge is utilised, whereas the practically applied trailing edge has a finite trailing edge of in the order of about 0.1 to 1% of the chord length. The bending of the flap may take place simultaneously with the deformation of the active elastic member, or the bending of the flap may take place in a separate step as indicated here. The lift diagram for the three profiles shown in FIG. 3A is shown in FIG. 3C. It is observed that the bending of the flap towards the suction side considerably boost the decrease of the lift coefficient. This is even more evident in FIG. 3D, where the decrease in the lift coefficient for the profiles relative to the original, non-deformed airfoil is shown. Here, it is observed that the decrease in lift for the airfoil with the flap bent towards the suction side is in the order of 30% or more below the critical angle of attack.

Figure 4:
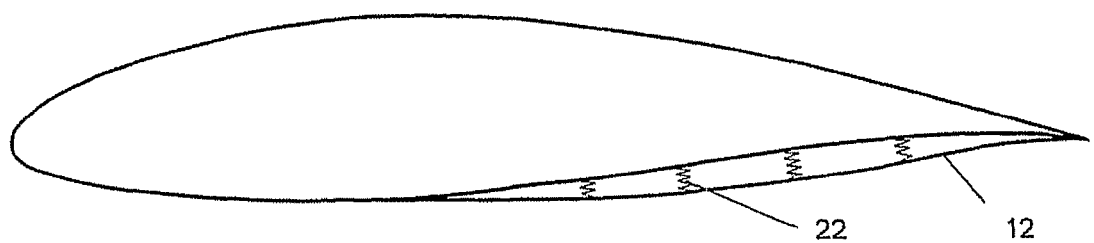
FIG. 4 shows cross section of a wind turbine blade according to the invention with a linear actuator means.
Figure 4:
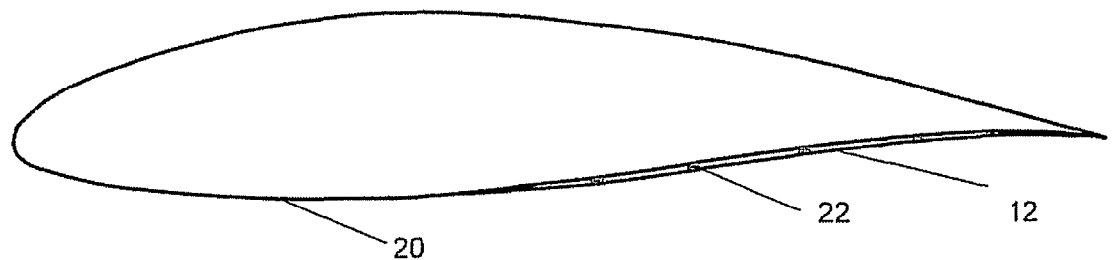

The blade cross sections shown in FIG. 4 indicate how linear actuators 22 may be utilised to actuate the deformation of the active elastic member 12. In FIG. 4A, the active elastic member 12 is shown in the deformed shape. The principle sketch in FIG. 4A has four linear actuators in the plane of the cross section, but either more or fewer actuators may be used dependent on the size of the actual blade, so that typically the larger the blade, the more the actuators. Furthermore, the required number of actuators also depends on the flexibility of the active elastic member. In FIG. 4B, the same blade cross section is shown, with the active elastic member in the non-deformed state and the actuators in a compressed state. The actuators are shown as positioned on top of the rigid blade wall 20, but in many cases, the actuators may preferably be integrated with or submersed into the blade wall.

Figure 5:
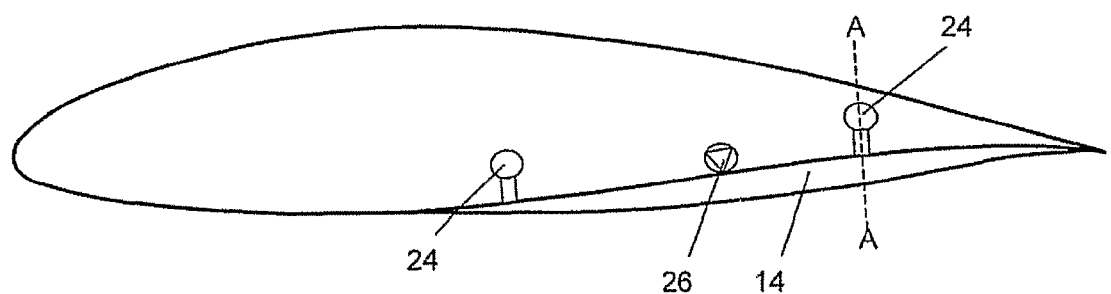
FIG. 5 shows cross section of a wind turbine blade according to the invention with a fluid distribution system.
Figure 5:
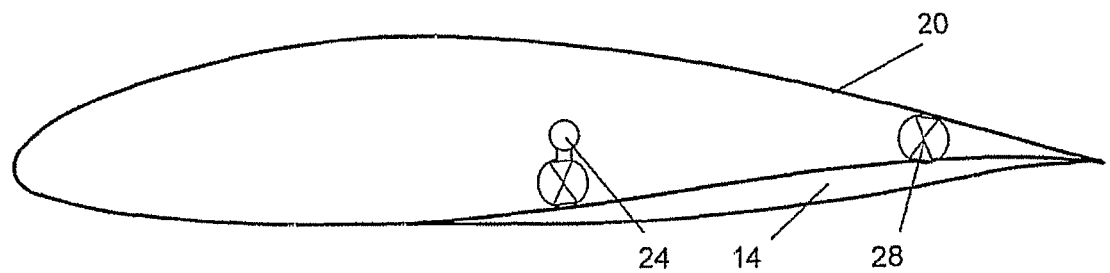

A cross section of a wind turbine blade with an active elastic member adapted for deformation by entering/retrieving fluid into the compartment 14 is shown in FIG. 5. In FIG. 5A, the blade also comprises a fluid distribution system 24. The system is basically formed by two tubes 24 arranged substantially orthogonal to the plane of the cross section. The tubes are in communication with the compartment 14 via connection fittings (not numbered). The tubes may e.g. be one tube for distributing the fluid to the compartment (preferably the tube towards the leading edge) and one tube for returning the fluid from the compartment to a unit for distributing the fluid, such as a pump (not shown). The tubes may be connected to further compartments arranged in other cross sections of the blade, A sensor 26, such as a pressure gauge, is arranged in communication with the compartment, so that the presence/absence of fluid and/or the pressure of the fluid may be established during use. The system described in FIG. 5A may for example be used for a circulated gas, such as air or nitrogen, or for a circulated liquid, such as water or another hydraulic fluid.

FIG. 5B illustrates a cross section of another embodiment of the wind turbine according to the invention. Here, only one distribution system or tube 24 is present. This embodiment may be particularly suitable in two distinct situations.

In the first case, it may be utilised when the active elastic member is operated by pressure so that during use the compartment is expanded by air or another gas entering from the fluid distribution system 24 via the receive valve 24 and into the compartment 14. The compartment is contracted by closing the receive valve connecting the distribution system 24 to the compartment and opening the release valve 28 so that the active elastic member will return to a relaxed state where the compartment is contracted by releasing the compressed air from the compartment. This requires that the equilibrium state of the active elastic member corresponds to the compartment being expanded.

In another case, the blade with the cross section illustrated in FIG. 5B may be operated by vacuum, so that during use, the compartment is expanded by air entering from the surface of the blade wall 20 via the receive valve 28. It should be noticed that the valve 28 has changed purpose from release mode in the above case to receive mode in the present case. The relaxed state of the compartment 14 should be for the compartment to be expanded (as shown in FIG. 5B). This is particularly advantageous from a safety point of view, as the relaxed state provides an airfoil with a lower maximum lift coefficient and hence will tend to lower the response of the wind in the unlikely case of failure. To contract the compartment, the receive valve 28 should be closed and the valve connecting the compartment 14 to the distribution system should be opened. The distribution system should be connected to a vacuum system, such as a vacuum pump to extract the air from the compartment.

Figure 6:
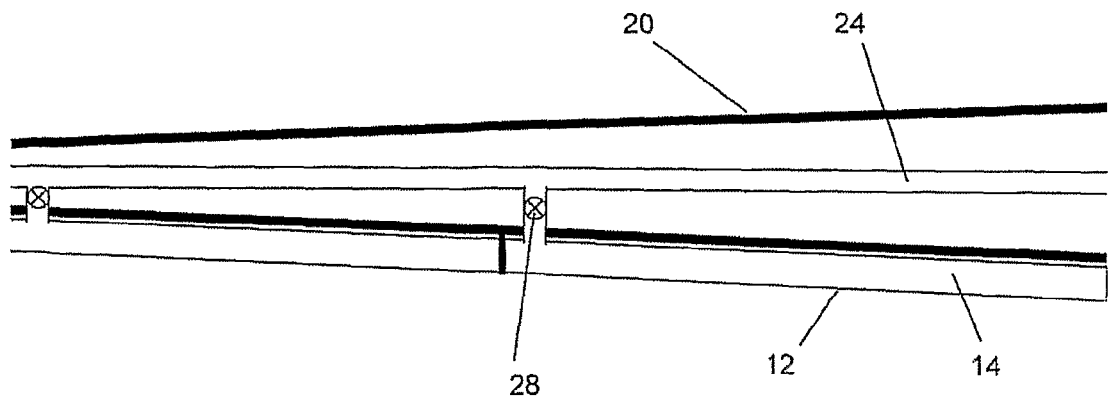
FIG. 6 shows cross section of a wind turbine blade according to the invention with a fluid distribution system.

FIG. 6 is a section along the length of the blade of FIG. 5 in the plane indicated by the dashed line A-A. The tube of the distribution system 24 is therefore preferably the return tube. This is also observed in FIG. 6 in that the connection to the compartments 14 of the active elastic member 12 is arranged near the end of the compartment 14 towards the tip of the blade. A valve 28 is arranged in the connection between the compartment 14 and the distribution system. The valve may e.g. be a magnetic valve or another valve operable by a control unit (not shown). The advantage of the arrangement of the connection between the compartment and the distribution system is mainly based on the fluid being forced towards the tip end of the compartment by the centrifugal force during use. This will help emptying of the compartment during use.

Figure 7:
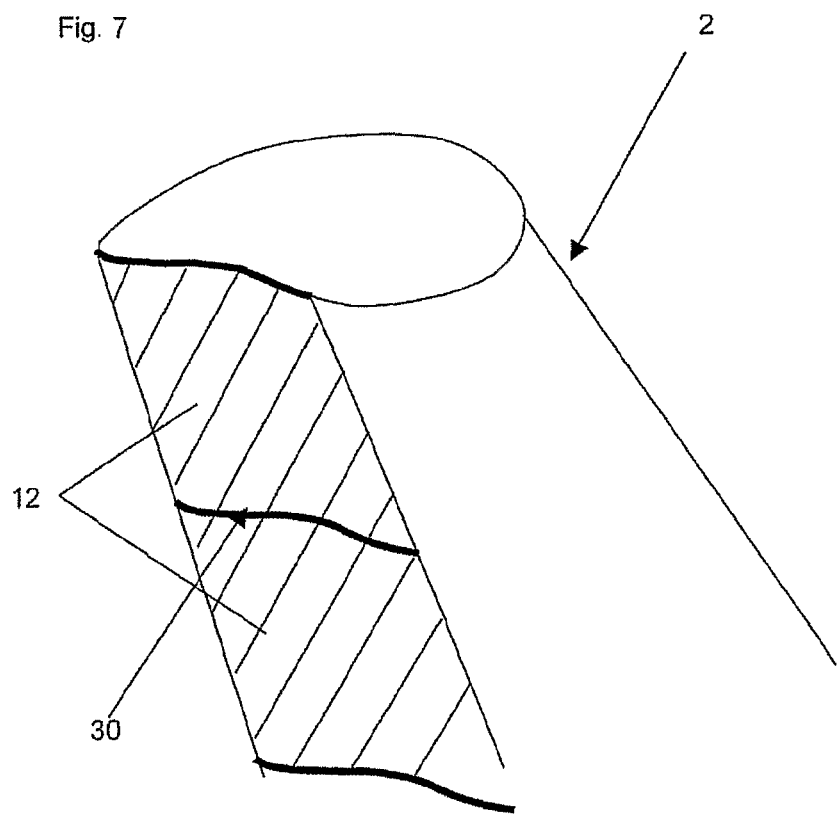
FIG. 7 shows a part of a wind turbine blade with active elastic members arranged end-to-end.

In FIG. 7 a piece of a wind turbine blade 2 is shown. The section of the blade, which is seen in FIG. 7, comprises two active elastic members 12. The active elastic members are connected in the longitudinal direction of the blade. The connection 30 between the adjacent active elastic members is preferably prepared so that no abrupt changes in the shape of the blade are present in any configuration of the active elastic members. By no abrupt change is here also meant changes in the longitudinal direction of the blade and not only transverse to the length of the blade. This reduces the likelihood of the airflow over the surface of the blade separating prematurely, i.e. away from the trailing edge.

Generally speaking, it is preferred that active elastic member(s) and/or flap(s) are arranged on the outermost part of the blade, such as the outermost ⅔ of the length of the blade or—more preferably—the outermost ½ of the blade, as the outer part of the blade is accounting for the majority of the power output. Furthermore, due to the momentum of the distance from the blade root, the outermost parts of the blade tend also to cause a majority of the fatigue wear, which may be reduced considerably by the wind turbine blades and the method according to the present invention.

Figure 8:
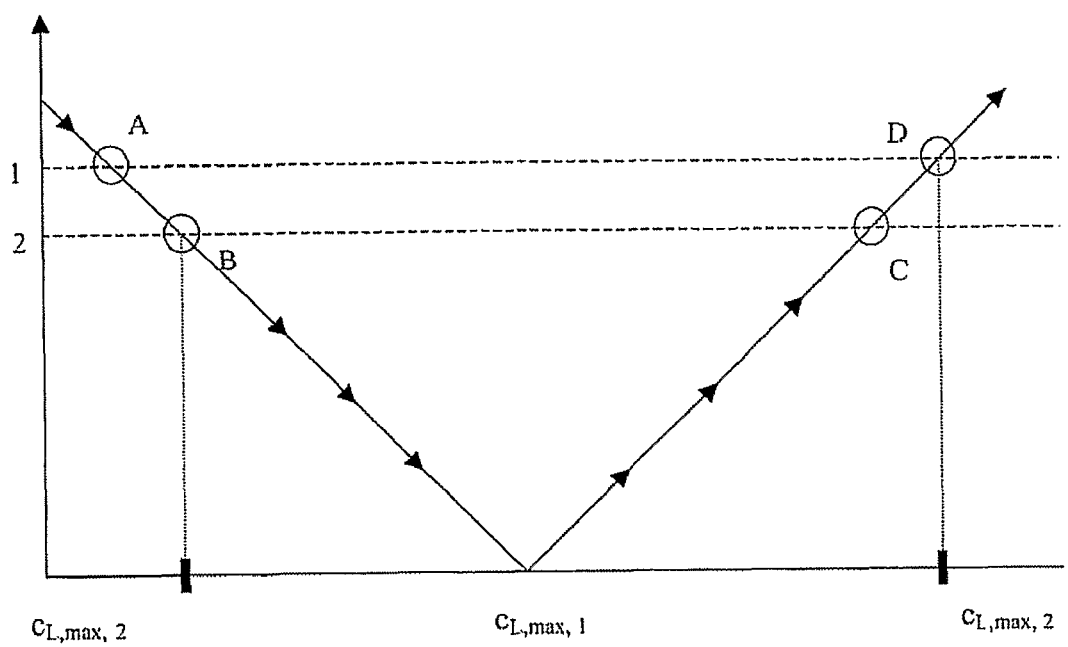
FIG. 8 shows an example of a principle of operating the wind turbine blade according to the invention.

FIG. 8 relates to a preferred overall principle of operating a wind turbine blade according to the invention. FIG. 8 indicates the desired response to a change in the speed of the incoming wind. This may either be the local incoming wind at the very active elastic member at the instant of operation, or an overall wind averaged over time or over position along the length of the blade. The y-axis indicates the speed of the incoming wind. Two threshold wind speed levels are indicated 1 and 2. Starting from the left hand side, the first half of the plot indicated how to react to a decrease in the speed of the incoming wind. At the extreme left hand side, the active elastic member should be configured in the second shape, i.e. with a relatively low maximum lift coefficient, $C_{L,max2}$. When the incoming wind reaches the upper threshold 1 (indicated by A), no change in the configuration of the active elastic member should take place, but when the incoming wind reaches the lower threshold 2 (indicated by B), then the configuration of the active elastic member should switch to the first shape, i.e. with a relatively high maximum lift coefficient, $C_{L,max1}$. Similarly when the incoming speed is gradually increased corresponding to the right hand side of the plot. When the speed of the incoming wind reaches the lower threshold 2 (indicated by C), then no change takes place, whereas when the speed of the incoming wind reaches the upper threshold 1, the active elastic member shifts to the first shape, i.e. with a relatively low maximum lift coefficient, $C_{L,max2}$.

The delayed switching allows for a safety margin. The safety margin may be limited according to the speed of the change of configuration and the rate of establishing the incoming wind speed, so that the faster the switching of configuration and the faster the rate of establishing the speed of the incoming wind, the narrower the safety margin should be utilised. Furthermore, the safety margin ensures that the active elastic member does not flip/flap forward and back without this being necessary. This method of operation is particularly suitable for establishing an optimum configuration based on mean incoming wind. It may be utilised for a wind turbine blade with just one active elastic member, but by overlapping several similar control patterns, typically one for each active elastic member or for each group of active elastic members, a fine control may easily be realised.

Figure 9:
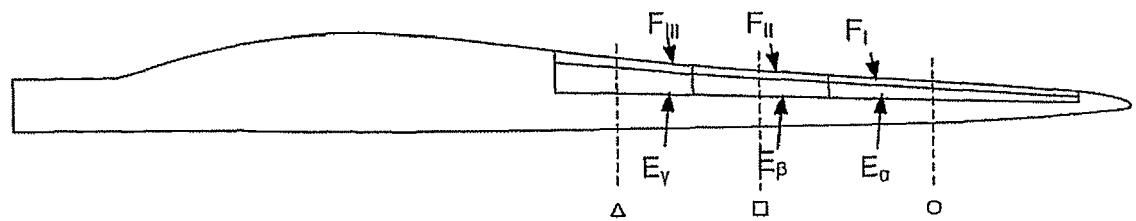
FIG. 9 shows a wind turbine blade and a principle of operating wind turbine blades e.g., under cyclic variation.
Figure 9:
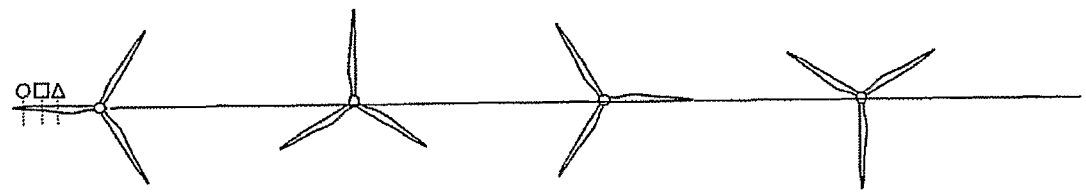
Figure 9:
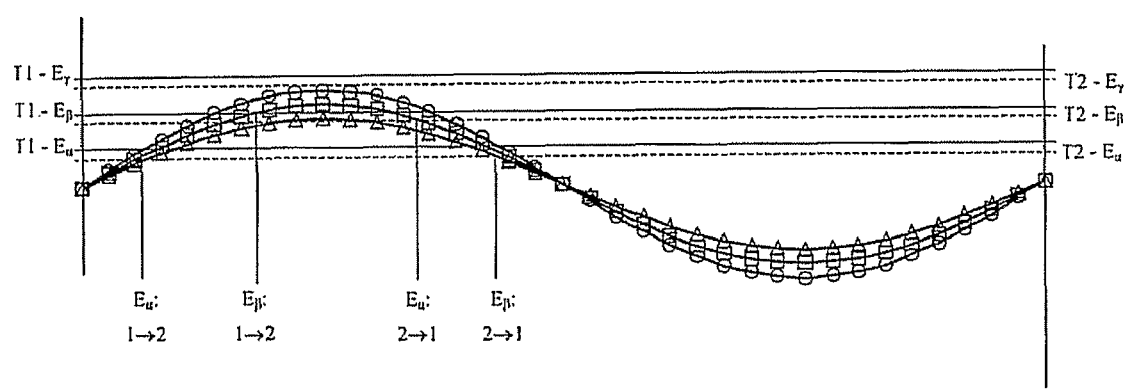

FIG. 9A shows a sketch of a wind turbine blade with three active elastic members $E_\alpha$, $E_\beta$ and $E_\gamma$ and three flaps $F_I$, $F_{II}$ and $F_{III}$. The flaps are arranged at a corresponding active elastic member. The flaps and active elastic members may e.g. be operated by artificial intelligence, such as fussy logic, or another self-learning expert system. Alternatively, a set of rules may be provided for the regulation of each of the flaps and active elastic members. In FIG. 9B an example of a set of rules is indicated. In the top of FIG. 9B, the speed of the incoming wind at each of the active elastic members is indicated. It is observed that the variation in the speed of the incoming wind is much greater for the tip part of the blade than for parts of the blade further towards the blade root. This illustrates the larger the wind turbines become, the poorer conventional cyclic pitch will be at providing an optimised power output, as pitching of the full blade cannot take into account the radial differences in the variation of the speed of the incoming wind. However, it was found that by utilising a wind turbine blade with means for adjusting the airfoil at various longitudinal positions along the length of the blade, the cyclic pitch may be considerably optimised by overlaying the cyclic pitch with a variation of the airfoil shape as a function of the longitudinal position along the length of the blade. This may e.g. be realised with the wind turbine blade according to the present invention.

In the lower part of FIG. 9B, an example of the regulation scheme described in FIG. 8 is shown for the active elastic members. First and second threshold values, T1 and T2 for each of the active elastic members, $E_\alpha$, $E_\beta$ and $E_\gamma$ are indicated by longitudinal lines. For this particular rotation of the wind turbine, it is observed that the active elastic member $E_\gamma$ is not shifted from the first shape at all, whereas during the movement of the blade towards the top position, the tip active elastic member, $E_\alpha$, is shifted from the first shape to the second shape before the middle active elastic member, $E_\beta$. Thereby the effective aerodynamic rotor diameter is virtually reduced. Upon the rotation of the blade towards the bottom position, first the middle active elastic member, $E_\beta$, and then the tip active elastic member, $E_\alpha$, is shifted to a shape with a higher lift. The variation of the incoming wind in FIG. 9B only takes into account the vertical variation of the incoming wind but other effects such as wake or shadow effects from neighbouring wind turbines, terrain or the wind turbine tower may similarly be taken into account. Furthermore, other input parameters such as output power, acoustic emission, load, etc. may similarly be used for regulation of the shape of the active elastic members and/or flaps. Other types of regulation than one or two threshold values such as continuous shape regulation preferably in combination with adaptive regulation may also be used for regulation of the shape of the active elastic members.

The variation in elasticity and merely the length of the blade lead to the tip being slightly out of phase when pitching the blade. This is for example a problem when the blade is operated with cyclic pitch. If the aerodynamic properties of the blade are mainly adjusted by active elastic members and/or flaps according to the present invention, or the operation of active elastic members is combined with pitching, then the delay due to elasticity of the blade may be circumvented and a much more optimum operation may therefore be realised.

Furthermore, as the wind turbines become larger, the variation in incoming wind speed realised by a blade increases. This is partially compensated by pitching, however, pitching cannot realise the optimum orientation of the airfoil in the full length of the blade at one time. Therefore an adjusting of the shape of the airfoil in combination with pitching is a substantial improvement over the traditional pure pitching approach to optimisation of the operation.

An individual feature or combination of features from an embodiment of the invention described herein, as well as obvious variations thereof, are combinable with or exchangeable for features of the other embodiments described herein, unless the person skilled in the art would immediately realise that the resulting embodiment is not physically feasible.

TABLE OF IDENTIFICATION

| | |
|---|---|
| 2 | Wind turbine blade |
| 4 | Suction side |
| 6 | Pressure side |
| 8 | Leading edge |
| 10 | Trailing edge |
| 12 | Active elastic member |
| 14 | Compartment |
| 16 | Flap |
| 20 | Wind turbine blade wall |
| 22 | Actuator means |
| 24 | Fluid distribution system |
| 26 | Pressure gauge |
| 28 | Valve |
| 30 | Connection between adjacent active elastic members |

The invention claimed is:

1. A wind turbine blade comprising:
a suction side and a pressure side, the sides being connected at a leading edge and a trailing edge, and
an active elastic member arranged with access to the surface of the wind turbine blade,
wherein the active elastic member is deformable from a first shape to a second shape, and the maximum lift coefficient, $C_{L,max1}$, of an airfoil with the active elastic member in the first shape is larger than the maximum lift coefficient, $C_{L,max2}$, of the airfoil with the active elastic member in the second shape, and
wherein said active elastic member is arranged so that the thickness of the blade changes upon deformation of the active elastic member in such a manner that the camber line is shifted.

2. The wind turbine blade according to claim 1, wherein the active elastic member is positioned in an area between the trailing edge and about 40% of the chord length from the leading edge.

3. The wind turbine blade according to claim 1, wherein said active elastic member is positioned in the outermost 50 radius-% of the blade.

4. The wind turbine blade according to claim 1, wherein said active elastic member is positioned in an area between maximum thickness of the airfoil of the blade and the trailing edge.

5. The wind turbine blade according to claim 1, further comprising:
an anemometer arranged near the tip of the blade, said anemometer being functionally connected to a control unit capable of controlling the shape of the active elastic member.

6. The wind turbine blade according to claim 1, further comprising:
a blade tension sensor positioned in the blade to establish the tension of the blade, said blade tension sensor being functionally connected to a control unit capable of controlling the shape of the active elastic member.

7. The wind turbine blade according to claim 1, comprising a plurality of active elastic members arranged at the pressure side of the blade.

8. The wind turbine blade according to claim 1, wherein the second shape of the active elastic member is a relaxed state of the active elastic member.

9. The wind turbine blade according to claim 1, wherein the maximum lift coefficient, $C_{L,max\ 1}$, of the airfoil with the active elastic member in the first shape is at least 10% larger than the maximum lift coefficient, $C_{L,max\ 2}$, of the airfoil with the active elastic member in the second shape.

10. The wind turbine blade according to claim 1, wherein the difference in the lift coefficient for the airfoil with the active elastic member in the first shape and the second shape, $\Delta c_L$, should be larger than 10% of the largest of the lift coefficients at an angle of attack for all angles of attack between $\alpha = \alpha_{max} - 5°$ to $\alpha_{max}$.

11. The wind turbine blade according to claim 1, wherein the maximum lift coefficient of the airfoil with the active elastic member in the first shape, $C_{L,max,1}$, is larger than 1.2 and/or the maximum lift coefficient of the airfoil with the active elastic member in the second shape, $C_{L,max,2}$, is below 1.0, where the maximum lift coefficient corresponds to Re in the range 1-10 million and a two-dimensional flow passing a smooth profile surface.

12. The wind turbine blade according to claim 1, wherein the camber line of the airfoil with the active elastic member in the first shape deviates by at least 1.5% of the chord length orthogonally from the chord line of the airfoil with the active elastic member in the first shape in at least 10% of the range between the leading edge and the trailing edge.

13. The wind turbine blade according to claim 1, wherein the active elastic member comprises a compartment for receiving a fluid.

14. The wind turbine blade according to claim 1, wherein the active elastic member in combination with a rigid part of the wind turbine blade forms a compartment for receiving a fluid.

15. The wind turbine blade according to claim 1, further comprising:

a flap positioned near the trailing edge of the airfoil; said flap being actuatable by an actuator between a first position and a second position;

wherein the maximum lift coefficient of the airfoil with the flap in the first position is larger than the maximum lift coefficient of the airfoil with the flap in the second position.

16. A subunit for installation on a wind turbine blade including a suction side and a pressure side defining a rigid blade surface and connected at a leading edge and a trailing edge, said subunit comprising:

an active elastic member adapted with regard to shape and size for connection to the rigid blade surface of the wind turbine blade, wherein during operation of a wind turbine comprising said wind turbine blade with said subunit, said active elastic member is deformable from a first shape to a second shape, and the maximum lift coefficient of the combined structure of the subunit and the wind turbine blade in the first shape, $C_{L,mas\ 1}$, is larger than the maximum lift coefficient of the combined structure of the subunit and the wind turbine blade with the active elastic member in the second shape, $C_{L,max\ 2}$, and wherein said active elastic member is arranged so that the thickness of the wind turbine blade changes upon deformation of the active elastic member in such a manner that the camber line is shifted.

17. A method of operating a wind turbine having a rotor with at least one wind turbine blade, comprising:

establishing the incoming wind speed with an anemometer positioned on the wind turbine blade, and if the incoming wind speed is below a first threshold value, deforming an active elastic member on the wind turbine blade from the second shape to the first shape so that the lift of the blade at the active elastic member is increased, wherein the active elastic member is arranged so that the thickness of the wind turbine blade changes upon deformation of the active elastic member in such a manner that the camber line is shifted.

18. The method according to claim 17, further comprising:

if the incoming wind speed is below a second threshold value, actuating a flap on the wind turbine blade from the second position to the first position so that the lift of the airfoil at the flap is increased, wherein the second threshold value is larger than the first threshold value.

19. The method according to claim 17, further comprising:

establishing the tension of the wind turbine blade with a blade tension sensor positioned in the wind turbine blade, and if the tension is below a first threshold value, deforming the active elastic member from the second shape to the first shape so that the lift of the airfoil at the active elastic member is increased.

20. The method according to claim 17, comprising:

establishing the rate of change of tension of the wind turbine blade with a blade tension sensor positioned in the wind turbine blade, and if the tension increases faster than a first threshold value, deforming the active elastic member from the first shape to the second shape so that the lift of the airfoil at the active elastic member is decreased.

21. The method according to claim 17, wherein the wind turbine is pitch-regulated and the method further comprises: adjusting the overall pitch angle of the blades according to the established wind speed.

22. The method according to claim 17, wherein the wind turbine blade comprises at least two active elastic members arranged at different distances from the blade root, and at least two of the active elastic members are independently deformable, the method further comprising:

for each active elastic member, establishing the incoming wind speed at the active elastic member, and if the incoming wind speed is below a local threshold value for that active elastic member, deforming the active elastic member from the second shape to the first shape so that the lift of the airfoil at the active elastic member is increased.

23. The method according to claim 17, wherein parameters for regulation of the operation of the wind turbine are optimized so that during operation, the wind turbine will produce maximum energy output within a threshold of wear of the wind turbine.

24. The method according to claim 17, wherein parameters for regulation of the operation of the wind turbine is optimized so that during operation the wind turbine will produce maximum energy output within a threshold of acoustic emission of the wind turbine.

25. The method according to claim 17, wherein deforming the shape of the individual active elastic members is repeated with a frequency of less than about 0.1 Hz.

26. The method according to claim 17, wherein deforming the shape of the individual active elastic members is repeated with a frequency of more than 10 Hz.

27. The method according to claim 17, wherein deforming the shape of the individual active elastic members is repeated with a frequency corresponding to less than an 8th of a rotation of the rotor.

28. The method according to claim 17, wherein deforming the shape of the individual active elastic members is repeated cyclically so that a period of the cyclical deformation corresponds to one rotation of the rotor.

29. The method according to claim 17, further comprising:

adjusting the individual pitch of the wind turbine blade in a cyclical manner.

30. The method according to claim 17, wherein the shape of at least one active elastic member is adjusted stepwise so that the active elastic member is either in the first shape or in the second shape.

31. The method according to claim 17, wherein the shape of at least one active elastic member or flap is adjusted substantially continuously so that the active elastic member may be deformed to several steps, continuously without any steps between the shape providing the smallest maximum lift coefficient and the shape providing the largest maximum lift coefficient.

32. The method of operating a wind turbine having a wind turbine according to claim 17, the wind turbine blade comprising a plurality of active elastic members, the method comprising:

establishing at least one of incoming wind speed, noise emission, strain of blade;

establishing a desired configuration of a plurality of the active elastic members based on artificial intelligence; and adjusting the active elastic members accordingly, wherein each of the establishing steps and the adjusting step are repeated at a frequency corresponding to at least 8 times a rotation frequency of the wind turbine blade.

33. A method for using a wind turbine blade according to claim 1 operable by individual radius dependent variation of the airfoil section, and wherein an active elastic member on the wind turbine blade is arranged so that the thickness of the blade changes upon deformation of the active elastic member in such a manner that the camber line is shifted.

34. A wind turbine comprising:
a hub,
at least one wind turbine blade,
an anemometer arranged on the hub,
said anemometer being functionally connected to a control unit capable of controlling the shape of an active elastic member positioned on the at least one wind turbine blade,
wherein the anemometer is a laser anemometer arranged at a non-horizontal angle and is capable of measuring the incoming wind speed in various distances from the laser anemometer so that the wind speed in a plurality of vertical levels in front of the wind turbine blade(s) may be established during use, and
wherein said active elastic member is arranged so that the thickness of the blade changes upon deformation of the active elastic member in such a manner that the camber line is shifted.

35. The wind turbine blade according to claim 5, wherein the anemometer includes at least one of a laser anemometer or a pitot tube.

36. The wind turbine blade according to claim 6, wherein the blade tension sensor includes at least one of a strain gauge arranged in a blade wall or a spar of the blade, or a sensor including an optical or conducting fibre.

37. The wind turbine blade according to claim 1, wherein the wind turbine blade defines a chord line extending between the leading edge and the trailing edge, the camber line extends between the leading edge and the trailing edge, and the chord line remains stationary upon deformation of the active elastic member such that the camber line is shifted relative to the stationary chord line.

* * * * *

UNITED STATES PATENT AND TRADEMARK OFFICE
CERTIFICATE OF CORRECTION

| | | |
|---|---|---|
| PATENT NO. | : 8,157,533 B2 | Page 1 of 2 |
| APPLICATION NO. | : 12/083819 | |
| DATED | : April 17, 2012 | |
| INVENTOR(S) | : Kristian Balschmidt Godsk et al. | |

It is certified that error appears in the above-identified patent and that said Letters Patent is hereby corrected as shown below:

Column 4

Line 33, change "are" to --is--.

Line 38, change "reduce" to --reduces--.

Column 5

Line 12, change "are" to --is--.

Line 67, delete "which".

Column 7

Line 1, change "is" to --are--.

Line 4, change "member is" to --members are--.

Line 19, change "a" to --α--.

Line 20, change "a" to --α--.

Line 22, change "a" to --α--.

Column 8

Line 8, change "move" to --moved--.

Line 63, change "readily" to --ready--.

Column 10

Line 28, change "reasonably" to --reasonable--.

Signed and Sealed this
Thirty-first Day of July, 2012

David J. Kappos
*Director of the United States Patent and Trademark Office*

CERTIFICATE OF CORRECTION (continued)
U.S. Pat. No. 8,157,533 B2

Column 13

Line 27, change "etch" to --etc.--.

Line 41, change "is" to --are--.

Column 15

Line 36, change "devise" to --device--.

Column 16

Line 51, change "shape" to --shapes--.

Column 18

Line 13, change "boost" to --boosts--.

Line 23, change "principle" to --principal--.

Column 20

Line 36, change "fussy" to --fuzzy--.

Column 23

Claim 16, Line 20, change "$c_{L,mas\ 1}$," to --$c_{L,max1}$,--.

Column 19

Claim 24, Line 19, change "is" to --are--.

Column 20

Line 9, after "Similarly" insert --, the right hand side of the plot corresponds to when the incoming speed is gradually increased-- and delete "when the incoming speed is gradually increased corresponding to the right hand side of the plot".

Column 24

Claim 32, Lines 51-52, delete "of operating a wind turbine having a wind turbine".